US006356842B1

(12) United States Patent
Intriligator et al.

(10) Patent No.: US 6,356,842 B1
(45) Date of Patent: Mar. 12, 2002

(54) SPACE WEATHER PREDICTION SYSTEM AND METHOD

(75) Inventors: Devrie S Intriligator, Santa Monica, CA (US); James M Intriligator, Arlington, MA (US)

(73) Assignee: Carmel Systems, LLC, Santa Monica, CA (US)

( * ) Notice: Subject to any disclaimer, the term of this patent is extended or adjusted under 35 U.S.C. 154(b) by 0 days.

(21) Appl. No.: 09/552,161

(22) Filed: Apr. 18, 2000

(51) Int. Cl.[7] .............................................. G06F 19/00

(52) U.S. Cl. ........................................................ 702/3

(58) Field of Search .......................... 702/3, 2; 706/21, 706/928, 930, 931

(56) References Cited

U.S. PATENT DOCUMENTS

| | | | | |
|---|---|---|---|---|
| 5,408,586 A | * | 4/1995 | Skeirik ......................... | 706/25 |
| 5,444,820 A | | 8/1995 | Tzes et al. .................... | 395/22 |
| 5,461,699 A | | 10/1995 | Arbabi et al. ................. | 395/23 |
| 5,673,366 A | | 9/1997 | Maynard et al. .............. | 395/20 |
| 5,682,503 A | * | 10/1997 | Yoda ............................ | 706/25 |

OTHER PUBLICATIONS

"Storms in Space," CRCSS Space Industry News, Issue 81, Dec. 1998, 7 pages.
Buonsanto et al., "Strides Made in Understanding Space Weather at Earth," Eos. vol. 78, No. 1, Jan. 7, 1997, pp. 1, 6–7, copyright 1997 [retrieved on Feb. 4, 1988]; retrieved from the Internet:<URL:www.agu.org/sci_soc/ecobuon.html>.
Cane, "The Evolution of Interplanetary Shocks," Journal of Geophysical Research, vol. 90, No. A1, pp. 191–197, Jan. 1, 1985.
Cane et al., "The Role of Interplanetary Shocks in the Longitude Distribution of Solar Energetic Particles," Journal of Geophysical Research, vol. 93, No. A9, pp. 9555–9567, Sep. 1, 1988.
Carmel Research Center, "Carmel Research Center Space Weather System for Forecasting Environmental Disturbances," Project Summary, submitted May 24, 1996.
Carmel Research Center, "Carmel Research Center Space Weather System for Forecasting Environmental Disturbances," Project Summary, submitted Jan. 23, 1997.
Carmel Research Center, "Solary Energetic Particles (SEPs) as Forecasters of Envirnmental Disturbances," Project Summary, submitted Jul. 7, 1995.
Chen et al., "Real–Time identification and prediction of geoeffective solar wind structures," Geophysical Research Letters, vol. 23, No. 6, pp. 625–628, Mar. 15, 1996.
Detman et al., "Real–time Kp Predictions from ACE Real Time Solar Wind," CP471, Solar Wind Nine, edited by Habbal et al., 1999, The American Institute of Physics.

(List continued on next page.)

Primary Examiner—Donald E. McElheny, Jr.
(74) Attorney, Agent, or Firm—Pennie & Edmonds LLP

(57) ABSTRACT

A system and method of forecasting space weather (at Earth or another location) based on identifying complex patterns in solar, interplanetary, or geophysical data. These data may include current or historical measurements and/or modeled data (predicted or simulated). Data patterns, both non-event and event-related, are identified even when another event is occurring. Such patterns may vary with recent/cyclic variations in solar (e.g. solar max/min), interplanetary, or geophysical activity. Embodiments are built around: (1) templates, (2) expert systems, (3) neural networks, (4) hybrid systems comprising combinations of (1), (2) and/or (3), and multimodal intelligent systems. Forecasts are customized and/or updated as new data arise and as systems are dynamically modified, e.g. via feedback between system parts. Numerical or other indexes are generated representing forecasts, associated confidence levels, etc.

105 Claims, 13 Drawing Sheets

OTHER PUBLICATIONS

Dooling, "Stormy Weather in Space," IEEE Spectrum, pp. 64, 66–72, Jun. 1995.

Dryer, "Multidimensional, Magnetohydrodynamic Simulation of Solar–Generated Disturbances: Space Weather Forecasting of Geomagnetic Storms," AIAA Journal, vol. 36, No. 3, pp. 365–370, Mar. 1998.

Fan et al., "Prediction of Geomagnetic Storms Following Solar Proton Events (SPEs) with a BP Neural Network," AI Applications in Solar–Terrestial Physics, Proceedings of ESA Workshop (WPP–148), pp. 163–166, 1988.

Freeman et al., "The Use of Neural Networks to Predict Magnetospheric Parameters for Input to a Magnetospheric Forecast Model," pp. 167–181.

Intriligator et al., "A kick from the solar wind as the cause of comet Halley's Feb. 1991 flare," Nature, vol. 353, pp. 407–409, Oct. 3, 1991.

Intriligator et al., "Mars in the Solar Wind," vol. 84, No. B14, pp. 8427–8435, Dec. 30, 1979.

Intriligator, "New Results on the Pioneer Venus Orbiter Feb. 10–11, 1982 Events: A Solar Wind Disturbance Not a Comet," Geophysical Research Letters, vol. 12, No. 4, pp. 187–190, Apr. 1985.

Intriligator, "Pioneer 9 and Pioneer 10 Observations of the Solar Wind Associated with the Aug. 1972 Events," Journal of Geophysical Research, vol. 82, No. 4, pp. 603–617, Feb. 1, 1977.

Intriligator et al., "Plasma Shocks and Energetic Particles in the Outer Solar System: Trapping and Asymmetry Observations from Pioner 10 and Pioneer 11," Journal of Geophysical Research, vol. 87, No. A6, pp. 4354–4364, Jun. 1, 1982.

Intriligator, "Transient Phenomena Originating At The Sun—An Interplanetary View," Solar and Interplanetary Dynamics, copyright 1980, pp. 357–374.

Joselyn, "Geomagnetic Activity Forecasting: The State of the Art," Review of Geophysics, 33, 3, pp. 383–401, Aug. 1995.

"National Space Weather Program Strategic Plan," Version 4.0, (Draft). prepared by the Working Group for the National Space Weather Program of the Committee for Space Environmental Forecasting of the Office of the Federal Coordinator for Meteorlogy, Mar. 1995.

Persinger, "When the Chips are Down," from Science Frontiers #80, Mar.–Apr., 1992 [retrieved on Feb. 4, 1998]; retrieved from the internet: <www.knowledge.co.uk/frontiers/sf080/sf80u20.htm>.

Smart et al., "PPS76—A Computerized 'Event Mode'Solar Proton Forecasting Technique," pp. 406–427 no date.

Smart et al., "A Simplified Model for Timing the Arrival of Solar Flare–Initiated Shocks", Journal of Geophysical Research, vol. 90, No. A1, pp. 183–190, Jan. 1, 1985.

Smith et al., "Forecasting Geomagnetic Storms using Energetic Particle Enhancements," CP471, *Solar Wind Nine*, edited by Habbal et al., 1999, pp. 577–580.

Wang et al., "Solar Wind Speed and Coronal Flux–Tube Expansion," The Astrophysical Journal, vol. 355, pp. 762–732, Jun. 1, 1990.

Wu et al., "Prediction of geomagnetic storms from solar wind data using Elman recurrent neural networks," Geophysical Research Letters, vol. 23, No. 4, pp. 319–322, Feb. 15, 1996.

* cited by examiner

SPACE WEATHER PREDICTION SYSTEM AND METHOD

FIELD OF THE INVENTION

The present invention relates to a system and method for predicting space weather, and in particular, for predicting solar-induced disturbances of the environment of near-earth space, such as geomagnetic storms. More specifically, the invention relates to predicting space weather based on the behavior of solar energetic particles ("SEPs"), which are created by the sun or by shocks and which precede solar-induced disturbances, and on solar, interplanetary and geophysical data.

BACKGROUND OF THE INVENTION

When solar flares, disappearing filaments, and other solar events occur on the sun they create great turbulences and disturbances in the region of space close to the sun. These disturbances are often so extreme that they create shock waves which travel through space and, ultimately, arrive at the earth or at other locations of interest (e.g. a spacecraft position, a comet, or a planet), where they can cause serious problems such as loss of spacecraft, spacecraft anomalies (such as bit flips in electronic components), surface charging problems, disruption of on-board computer memories, and even damage to the structure of semi-conductor microelectronics and solar cells. The charged particles, including energetic electrons and protons, associated with these disturbances can do as much damage to solar cells and other hardware in one disturbance as several years' exposure to the undisturbed environment. For example, energetic electrons can cause large static charges, some measuring as high as 19,000 volts, to build up in insulators deep in spacecraft, which may cause arcing that damage sensitive electronic components. In addition, astronauts both inside and outside a spacecraft, space station or shuttle can be subjected to dangerous doses of protons and other types of radiation during these disturbances.

These disturbances can also cause communications blackouts at all frequencies, not only with spacecraft, but with high-flying aircraft and with ground-based objects. High frequency (HF) radio wave communication is more routinely affected since it depends on reflection from the ionosphere to carry signals great distances. Ionospheric irregularities caused by solar disturbances give rise to signal dispersion, fading, and even complete signal loss during very disturbed conditions. Ionospheric irregularities also affect the higher frequency radio waves used by telecommunication companies that penetrate the ionosphere and are relayed via satellite to other locations. The ionospheric irregularities can even prohibit critical communications such as search and rescue efforts and military operations.

One example of a serious space weather related communications failure took place in the early 1980s when President Reagan was on Air Force One on his way to China—all communications were lost with the plane for more than two hours. Mr. Reagan and his advisors were upset and concerned; they were subsequently informed that the failure was due to disturbances that originated on the sun and eventually propagated to the near earth environment.

In addition to communications systems, marine navigation systems using very low frequency signals, such as LORAN and OMEGA, depend on accurate information on the altitude of the bottom of the ionosphere. During environmental disturbances, rapid vertical changes occur in the location of this boundary, introducing significant errors of up to several kilometers in determinations of location.

Global Positioning Systems (GPS) are also sensitive to space weather disturbances. These systems have a wide variety of applications including aircraft navigation and air traffic control systems. However, because they operate by transmitting radio waves from satellites to receivers on the ground, in aircraft, or in other satellites, they are very sensitive to ionospheric disturbances. Significant errors can result when signals are reflected, refracted and slowed by disturbed ionospheric conditions.

Electric power companies are also affected by space weather disturbances because their long power lines are susceptible to electric currents induced by the dramatic changes in high-altitude ionospheric currents occurring during geomagnetic storms. Surges in power lines from ground induced currents (GICs) can cause massive network failures and permanent damage to expensive equipment. It is estimated that the March 1989 Hydro-Quebec power black-out, which was caused by a space weather disturbance, cut electric power to several million people.

With accurate early warning, spacecraft operators can take effective remedial action, such as phased shut downs of components where the most sensitive elements are turned off first and the other components are shut down closer to the predicted onset of the event. Other remedial actions include downloading spacecraft memory to ground-based memory; shutting down all spacecraft systems except those necessary for real-time tracking; increasing real-time monitoring of satellite operations for anomalies; delaying major changes in vehicle potential caused by turning on/off susceptible components; and calculating the best time to adjust a low earth orbit for drag. For military communications, redundant transmissions could be scheduled along with real-time human monitoring as a check of communication integrity. For space stations and shuttles, extra-vehicular activity could be curtailed, launches could be delayed or early landings planned to avoid a disturbance.

Such remedial actions are currently impractical due to the generally short lead time (approximately one hour) and overwhelming inaccuracy (over 80 percent false alarms) of space weather disturbance predictions. If operators were given an accurate warning at least several hours in advance of a space weather event, they would have a great deal more flexibility in developing and implementing strategies for protecting their spacecraft, systems, and/or astronauts. In addition, power companies could, for example, reduce the load on transmission circuits, confidently reset tripped protective relays on power networks, selectively ground capacitor banks to prevent large potential drops and delay power station maintenance and equipment replacement. Telecommunication companies could, for example, look for alternate frequencies for transmissions and effect plans to minimize communications outages.

The space weather forecasts provided by the National Oceanic and Atmospheric Administration's (NOAA's) Space Environment Center (SEC), the civilian office responsible for space weather forecasts, demonstrate the need for improvement that this invention addresses. Until several years ago, these forecasts were made entirely "by eye." Operators would examine the raw data (primarily solar magnetic field, x-ray, and optical data) and then, based on intuition and experience, issue forecasts. According to the SEC's own statistics, only 30% of the storms that they forecast actually occurred. There are also many false negatives (i.e., times when they do not forecast storms that do occur) and the generally brief forecast horizon often does not provide sufficient time for effective remedial action.

Recently, others have attempted to generate more 'objective' forecasts based at least in part on solar wind and interplanetary magnetic field (IMF) data obtained from the Advance Composition Explorer (ACE) and the WIND spacecraft. Both these spacecraft are very close to the Earth (compared to the distance between the Earth and the sun) and therefore forecasts based on their measurements of solar wind and IMF have a very short lead time. Typically, these systems produce forecasts that have a lead time of one hour or less and often they are ex post facto (i.e. they generate a "prediction" after the event has already begun to disturb the geophysical environment).

Still other forecasting approaches rely upon data from solar event observations, inputting these data into various theoretical models that attempt to predict how the solar events, and their associated shock waves, will propagate through space and effect space weather. The Wang-Sheeley model, the Interplanetary Shock Propagation Model (ISPM) (see Dryer, M. 1998, "Multidimensional simulation of solar-generated disturbances: Space weather forecasting of geomagnetic storms," *AIAA Journal*, 36, 365–370), and the Shock Time Of Arrival (STOA) model (see Smart, D. F. and Shea, M. A. 1985, "A simplified model for timing the arrival of solar flare-initiated shocks," *Journal of Geophysical Research*, 90, 183–190) are examples of various theoretical models. These approaches have met with limited success due in part to the difficulty of accurately modeling the propagation of solar events through space and often in part to the lack of complete data on the solar events themselves.

It has been recognized that there is an association between SEP events and subsequent geomagnetic storms. SEPs are created when a large disturbance occurs on the sun and as the disturbance propagates through space. Some of these particles travel towards distant locations (e.g. the Earth, spacecraft, etc.) much more rapidly than the interplanetary shocks that cause many space weather events. They thus may potentially extend the space weather forecast horizon to several hours in advance of a storm and, at times, even a day or more in advance.

Past attempts to use SEPs for space weather prediction have been limited. For example, J. Joselyn described a simplistic technique for forecasting geomagnetic activity. She compared a single measure of SEP activity in only one energy channel to a set threshold. In particular, she looked at SEP events in which a flux of more than 10 protons per centimeter/second of energies exceeding 10 MeV (million electron-volts) occurred for at least 30 minutes; i.e., See Joselyn, J. 1995. Geomagnetic Activity Forecasting: The State of the Art. *Reviews of Geophysics*, 33, 3. Based on that criterion, she determined that between 1976 and 1989 such events preceded geomagnetic storms (Ap>30, where Ap is the well known global geomagnetic index) within 2–3 days 62% of the time. Joselyn also found that events with peak energetic particle fluxes exceeding 100 flux units preceded geomagnetic storms 75% of the time. Joselyn did not discuss the number or percentage of geomagnetic storms that a forecast based on such events would miss. Joselyn only compared SEP flux to a simple threshold, i.e., a single SEP data value. This simple single point comparison is too simplistic for useful prediction.

More recently, Q. Fan and J. Tian have used measures derived from two SEP values (e.g., the rise rate of SEP flux over time) as inputs to a neural network to attempt to classify the intensity of geomagnetic storms based in part on SEP data. See Fan, Q. and Tian, J. 1998, Prediction of geomagnetic storms following solar proton events (SPEs) with a back-propagation neural network, "Prediction of Geomagnetic Storms Following Solar Proton Events (SPEs) With a BP Neural Network," *AI Applications in Solar-Terrestrial Physics*. Proceedings of ESA Workshop (WPP-148), edited by I. Sandahl and E. Jonsson, pp. 163–166. Each SEP (proton and electron) flux rise rate was based on only two SEP flux values, the background flux value and the peak flux value. Although Fan and Tian thus begin to recognize the value of time variations in SEP data, they, and Joselyn, failed to capture the potential of solar energetic particles as a space weather prediction tool.

Previous attempts at using SEPs in space weather forecasting have met with only limited success for many reasons. First, the prior work based predictions on only one SEP data point (a threshold or peak value) and/or measures derived from two SEP data points (such as rise rate). They therefore are not capable of identifying complex patterns in SEP data, associated with space weather events, that require consideration of three or more data points. Second, the prior work was based on analysis of only SEP data preceding space weather events, but not of SEP data preceding non-events; any system that does not take into account non-events is susceptible to false alarms and is unable to give all clear signals. Third, the prior work does not recognize the fundamental importance of recent and/or cyclical variations in SEP data (and solar, interplanetary and geophysical activity), such as variations that occur across different phases of the solar cycle. Fourth, the prior work does not provide any indication of a confidence level, such as a numerical confidence index, in a forecast. Fifth, the prior work was unable to provide a forecast while another event was in progress. Sixth, the prior work was unable to meaningfully update forecasts as new data came in.

SUMMARY OF THE INVENTION

It is therefore an object of the present invention to provide improved and timely space weather forecasts based on real time SEP data and solar, interplanetary and geophysical data.

It is a further object of the present invention to provide space weather forecasts based on the identification of complex patterns in SEP data requiring consideration of three or more different SEP data values.

It is another object of the present invention to provide a space weather forecasting system that identifies SEP data, and solar, interplanetary and geophysical data, associated with space weather non-events.

It is yet another object of the present invention to provide space weather forecasts that take into consideration recent and/or cyclical variations, such as variations due to the phase of the solar cycle, in SEP data and solar, interplanetary and geophysical data.

It is yet another object of the present invention to provide space weather forecasts that can be meaningfully updated as new data are made available and as the system is dynamically modified (e.g., via data feedback, etc.).

It is yet another object of the present invention to provide a system capable of generating space weather forecasts during periods when another space weather event is already in progress.

It is yet another object of the present invention to provide a space weather forecasting system capable of generating a numerical index representing a confidence level associated with a space weather forecast.

It is yet another object of the present invention to provide a space weather forecasting system capable of working as a "hybrid system," whereby different parts of the system are specialized for different types of prediction and thus the overall system accuracy is improved.

It is yet another object of the present invention to provide a space weather forecasting system capable of being modified as a result of current forecasting accuracy/inaccuracy to increase future forecasting accuracy.

The above and other objects are realized by the system and method of the present invention. Briefly, the present invention provides a system and method of forecasting space weather events based on identifying complex patterns defined by three or more SEP data values and associated patterns in solar, interplanetary or geophysical data. The present invention further identifies data patterns associated with space weather non-events, as well as those patterns associated with events. In addition, the patterns identified may change depending on recent or cyclic variations in solar, interplanetary or geophysical activity, such as variations associated with the phase of the solar cycle.

Three embodiments of the present invention are described below: (1) a template-based embodiment, (2) an expert system-based embodiment, and (3) a neural network based embodiment. The template-based embodiment predicts space weather based on a comparison of current SEP data (and other solar, interplanetary or geophysical data of interest) with historically derived "templates," each containing three or more SEP data measurements (and other data of interest) associated with the presence or absence of a particular type of space weather event. Separate templates are provided, where appropriate, for different recent and/or cyclic variations in solar, interplanetary, or geophysical activity, such as, but not limited to, variations associated with the phase of the solar cycle. The expert system-based embodiment predicts space weather based on a set of rules that identify patterns in SEP data comprising three or more data points. Such patterns include (i) a peak in SEP data and (ii) a steep rise or peak in x-rays followed by a steep rise or peak in SEPs. Again, separate rules are provided, where appropriate, for recent and/or cyclic variations in solar, interplanetary or geophysical activity. The neural network embodiment predicts space weather based on the input of three or more current SEP data values, possibly together with solar, interplanetary or geophysical activity data values, and, where appropriate, information regarding recent and/or cyclic variations in solar, interplanetary or geophysical activity. It is trained with data from quiet weather states as well as stormy states and, where appropriate, it can be trained with information regarding recent and/or cyclic variations in solar, interplanetary, or geophysical activity. Alternatively, where appropriate, separate neural networks may be used for different phases associated with recent and/or cyclic variations in activity.

More particularly, in the template-based embodiment, the system forecasts space weather events based on comparisons of real-time data with historically derived "templates." These templates contain representations of activity associated with a particular type of space weather event or with a non-event. For example, three templates might be used, each representing the SEP activity before storms of different severities. Each of these templates may consist of ten hourly measurements of the number of SEPs having energy >1 MeV for a particular phase of the solar cycle. This embodiment then finds the best match between the last ten hours of real time SEP data and the set of templates associated with the current phase of the solar cycle. The template that most closely matches the new data is used to determine the current forecast. As more data are obtained (for example, over the next few hours), new comparisons are made and the forecast updated. Additionally, a template may include other data of interest, as identified below, such as x-ray data. The system then finds, in this example, the template that most closely matches the recent SEP and x-ray data.

In the expert system embodiment, space weather forecasts are based on a set of rules that identify patterns in SEP data comprising three or more data points and associated patterns in solar, interplanetary or geophysical data. For example, a rule may involve the detection of a "peak" (i.e. a pattern of "low-high-low") in SEP data, having particular characteristics based on the current phase of the solar cycle (i.e., the particular characteristics of the peak are derived from earlier data associated with a phase of the solar cycle that is the same as the current phase). Alternatively, a rule may involve a relationship between SEP and other data, such as the detection of a peak in x-ray data followed by a steep rise or peak in SEP data. Still further, a rule may involve modifying SEP and other data, by for example "blurring" it, to filter out anomalous or insignificant measurements.

In the neural network embodiment, one or more neural networks are trained with three or more SEP data items associated with space weather events, possibly together with associated solar, interplanetary or geophysical data, and, where appropriate, solar cycle phase data, or other data identifying a phase of a recent or cyclic variation in data. The neural networks are also trained with non-event data for more accurately predicting times when no space weather event will occur and for signaling all clear. The neural networks are then used to generate forecasts based on recent SEP data and, where appropriate, solar cycle phase. Alternatively, the neural network may additionally be trained with other solar, interplanetary and geophysical data of interest, such as, but not limited to, x-ray data.

In general, these embodiments of the invention are not limited to space weather forecasts based upon SEPs or solar data in a particular energy band or having a particular flux level. Nor are they limited to a particular species of particle (protons, electrons, alphas, oxygen ions, iron ions) or waves (x-ray, radio waves, microwaves, etc). Nor are they limited to the use of actual SEP or solar or interplanetary or geophysical data -modeled or simulated data can be used, or in many instances, precursory signals such as microwave bursts, disappearing filaments, sunspot activity, helioseismology parameters, etc. can be used as proxies for actual data.

Furthermore, the template embodiment is not limited to a specific technique for creating the templates, nor to a particular number of templates, nor to the use of a particular technique for comparing new data to the templates. Also, the expert system is not limited to any particular static (or even dynamic) set of rules that determines how the identification and/or classification of data satisfying a particular set of criteria is accomplished. Finally, the neural network embodiment is not limited to a specific technique for training the neural networks nor to a particular neural network architecture.

For each of the embodiments, one or more inputs could be from the results of another template system, expert system or neural network, or from a hybrid combination of these.

DESCRIPTION OF THE PREFERRED EMBODIMENTS

Figure 1:
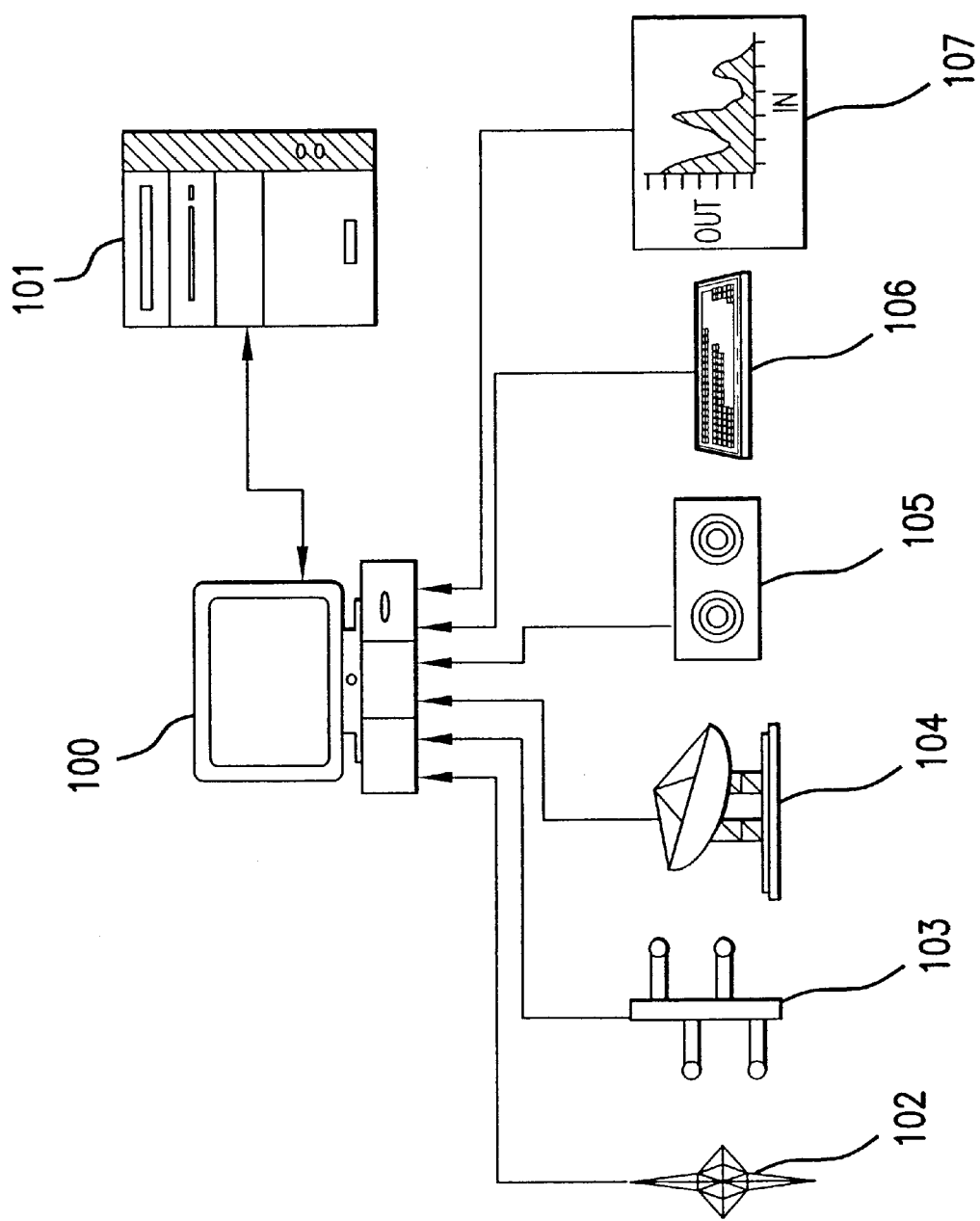
FIG. 1 illustrates the basic hardware setup of a preferred embodiment of the present invention.

Solar energetic particles include protons, electrons, alphas and various species, such as $He^3$, $He^4$, Fe, O, etc. SEP data include (i) species ratios, such as protons/alphas, $He^3/He^4$, Fe/O, etc., (ii) various integral and differential energy ranges (e.g., >1 Mev, between 3 and 5 Mev, etc.), (iii) fluxes, log fluxes, flux ratios, and other derived parameters and variations of flux in, between, and across various energy ranges (e.g. the energetic particle counts over a recent time interval) (iv) spectral shapes, spectral ratios, and other derived spectral parameters and variations, (v) time between occurrences of SEP events, their duration or rate of change (e.g., gradual, impulsive), the number of hours since the last SEP event, etc. Other data of interest include (i) solar data, such as, but not limited to, x-ray, optical, gamma-ray, radio wave, microwave, disappearing filament, EUV, UV, heliomagnetic, helioseismologic data, (ii) geophysical data, such as, but not limited to, Kp, Ap, geomagnetic storm and Dst data, (iii) interplanetary data, such as, but not limited to, waves, derived parameters (e.g., shock speed, direction, strength, etc.) and (iv) other variations and derived parameters of the data, such as time between occurrence of events, the duration of events, the number of hours since the last event, the number of hours since the event before the last event, etc.

The term "space weather disturbance" is used to refer to many events including, but not limited to, any (or any combination) of the following occurrences:

(a) The occurrence of a "sudden commencement," i.e., an abrupt increase in the strength of the horizontal component of the earth's magnetic field.

(b) A sudden change (rise or fall) in the level of Kp, where Kp is the planet-wide (global) average K index. The K index is a quasi-logarithmic number between 0 and 9 derived from measurements during specified 3-hour periods of the maximum deviation (in nanoteslas) of the observed geomagnetic field from expected quiet field conditions. The K index is adjusted for expected geophysical biases between observing sites.

(c) A sudden change (rise or fall) in the level of A, AA, Ap or other geophysical indices.

(d) The occurrence of local ground-induced currents (GICs).

(e) The occurrence of regions of high radiation in the upper atmosphere or Earth's magnetosphere.

(f) The formation or dissolution of radiation belts in the Earth's magnetosphere.

(g) A sudden change (rise or fall) in the level of Dst, where Dst is the planet-wide (global) index of the ring current and is based on ground measurement of the variation in the horizontal (H) component of the Earth's magnetic field.

(h) The occurrence of a solar or interplanetary shock at Earth or in the nearEarth environment and its arrival time, strength, speed, post-shock solar wind velocity and geo-effective interplanetary magnetic field component, minimum time between shock arrival and coronal mass ejection arrival, etc.

(i) A compression or expansion of the Earth's magnetosphere.

(j) The disruption of spacecraft function, communication, or data flow due to solar-shocks, energetic particle events, etc.

(k) Secondary disruptions of spacecraft function, communication, or data flow due to solar-shocks, energetic particle events, etc., including, but not limited to, failure of Global Positioning Systems (GPS), failure of air-traffic control systems, failure of cellular telephones, interruptions of television or radio broadcasts, etc.

(l) A change in the position of the equatorward edge of the auroral oval, its tailward displacement, and the polar cap potential.

(m) Intense and quiet SEP time profiles, peak flux, energy, fluence, etc.

(n) A radiation hazard to the International Space Station, astronauts, high-flying aircraft, etc.

(o) Any of the above disruptions at non-Earth locations. For example, the above disruptions could also take place on or near spacecraft (e.g. Intriligator, D. S. 1977, Pioneer 9 and Pioneer 10 observations of the solar wind associated with the August 1972 events, *Journal of Geophysical Research*, 82, 603–617), comets (e.g. Intriligator, D. S. and Dryer, M. 1991, A Kick from the Solar Wind as the Cause of Comet Halley's February 1991 Flare, *Nature*, 353, 407–409), or other planets (e.g. Intriligator, D. S. and Smith, E. J. 1979, Mars in the Solar Wind, *Journal of Geophysical Research*, 84, 8427; Intriligator, D. S. 1985, New Results on the Pioneer Venus Orbiter February 10–12, 1982 Events: A Solar Wind Disturbance Not a Comet, *Geophysical Research Letters*, 12, 187–190).

(p) Any of the above at a defined position (e.g., geographic, magnetospheric, environmental, interplanetary, planetary, etc.) and at that position its onset, duration, severity, peak flux, intensity, etc.

FIG. 1 shows the basic hardware setup of an embodiment of the present invention. Computer 100 and storage device 101 contain the software and data that perform the functions of the space weather prediction system of the present invention. Computer 100 may also be connected to one or more sources of data such as (but not limited to):

a) either direct or indirect connection to a data stream from an instrument or spacecraft 102, such as GOES, STEREO, WIND, or ACE, that measure energetic particles, b) a network 103, such as the Internet, an intranet, or other high-speed datalink (e.g. to NOAA's Space Environment Center, which provides frequently updated information on energetic particle measurements),
c) ground-based observatories 104,
d) historical archives 105 (for, e.g., testing purposes), such as the archives at the National Geophysical Data Center,
e) a keyboard 106, enabling entry of data by a human computer operator,
f) a source of model-generated data 107.

In a preferred embodiment, forecasts are based on complex patterns of SEP data and optionally solar event data associated with a space weather event or with quiet conditions (i.e., a non-event) and optionally on the phase of the solar cycle. Energetic particle data are often measured in different energy-ranges. Typically, these energy ranges include: >1 Mev, >2 Mev, >4 MeV, >10 MeV, >30 MeV, and >60 Mev. Within each energy range a measurement is made of the energetic particle flux, i.e., the number of particles arriving per square centimeter per steradian per second. The embodiments described below can operate on any or all of these energy ranges or, alternatively, on any combination or derived energy ranges (e.g. 2–5 MeV, log (4–10 MeV), Fourier components of 2–5 MeV, or other measured, simulated, or derived energy ranges or distributions). Additionally, other energetic particle data, such as species (He-3, He-4, Fe, O, etc.) or species ratios (e.g. He-3/He-4, etc), could also be used.

In addition to SEP data, there are many kinds of solar data that can be used either on their own, as proxies for SEP data, or to complement SEP data. These additional kinds of data may include, but are not limited to, changes in intensity, frequency, polarity, location, and/or direction of solar-surface magnetic field structures, coronal hole structures, x-rays or radio waves, helioseismology parameters, filament or arcade structures, etc. Also, interplanetary proxies (such as waves or other phenomena generated by shocks in transit) can be used.

Template-based Embodiment

The template-based embodiment has two stages. In the first stage, templates are created, for example, through the process illustrated in FIG. 5 or a similar process illustrated in FIG. 6. In the second stage, the invention generates predictions by comparing new data to the templates, as illustrated in FIG. 7.

Figure 2:
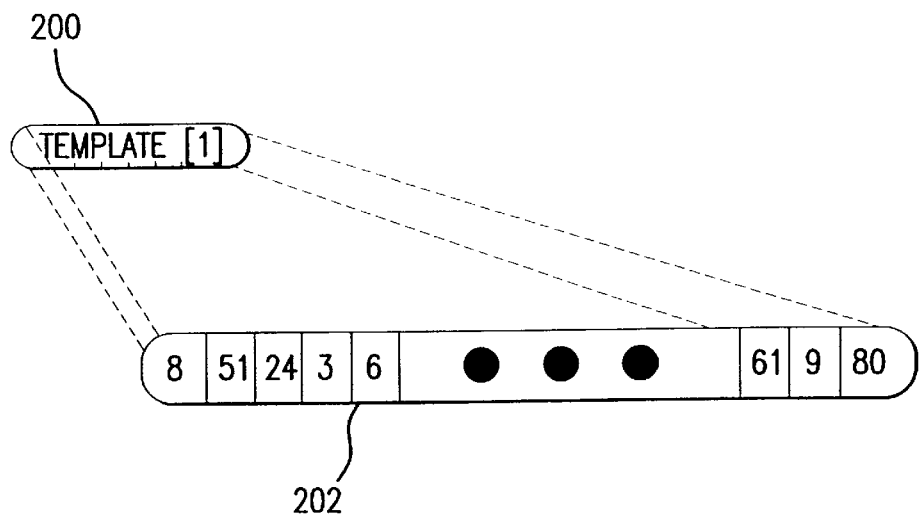
FIG. 2 illustrates the structure of a TEMPLATE element.

As shown in FIG. 2, each TEMPLATE 200 is an ordered series (e.g., a vector or array) of values 202. (Unless otherwise stated, the data provided in the figures and description herein are for illustrative purposes only and do not reflect actual data measurements.) Values 202 may be, for example, the flux of SEPs in a particular energy range. Each template 200 may comprise, for example, between 3 and 300 elements. The number of elements may vary depending on, among other factors, the variable(s) being used to generate predictions and the CRITERIA used for the TEMPLATE generation, as discussed below.

In a preferred embodiment, each TEMPLATE also can be tagged with information regarding the phase of the solar cycle at the time the data in the TEMPLATE were collected.

TEMPLATES can be created, for example, based on time-locking to a solar event (e.g. the time of an optical flare or x-ray burst is taken as time zero) or time-locking to a space weather disturbance (e.g. the time when Ap first exceeded 30 is taken as time zero). The process of TEMPLATE creation is almost identical in the two cases. The main difference is the data that are included in the TEMPLATES and how subsequent space weather predictions are made. If time-locking is based on a solar event then SEP or other data near (i.e., before, during, and/or after) the solar event are included in the TEMPLATES. If, on the other hand, time-locking is based on a space weather disturbance, then, although data near the space weather disturbance may still be included in the TEMPLATES, it is particularly the SEP or other data preceding the disturbance that are included.

Figure 3:
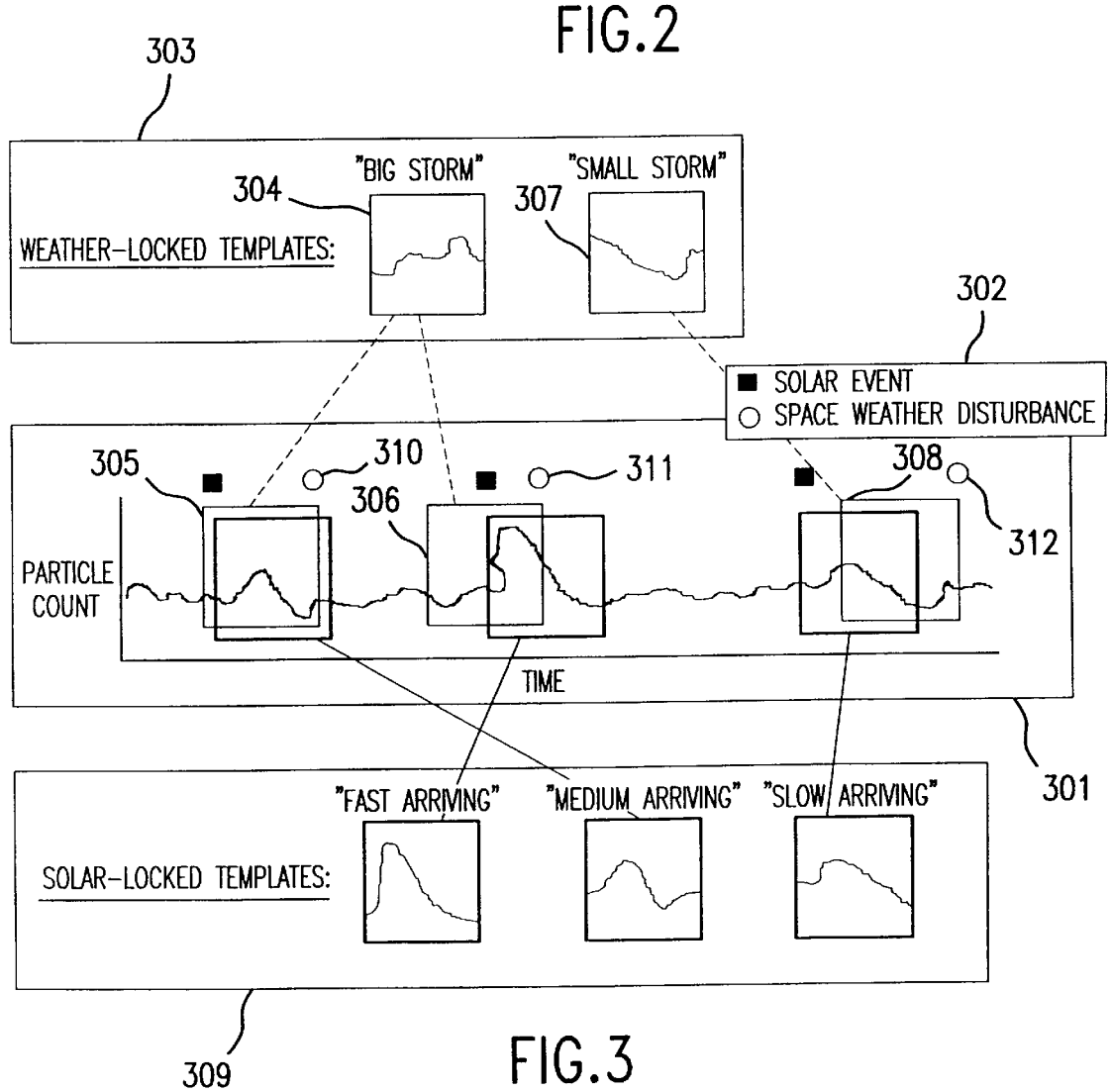
FIG. 3 is a representation of a solar event locked and a space weather disturbance locked TEMPLATE.

These time-locking approaches are illustrated in FIG. 3. In center panel 301, hypothetical particle data are shown over a time interval for a particular phase of the solar cycle. The data shown are entirely hypothetical and are for illustrative purposes only. The legend 302 identifies the two types of markers used in FIG. 3—squares represent solar events, e.g. flares; circles represent space weather disturbances, e.g. sudden commencements. In this illustration, space weather disturbances 310 and 311 are big storms and space weather disturbance 312 is a small storm. The upper panel 303 illustrates two TEMPLATES time-locked to space weather disturbances, taking the data preceding the disturbance for inclusion in the templates. In this illustration, the first template 304 represents the average particle activity before a large storm, derived by averaging the data preceding 310 and 311 (i.e., the data in boxes 305 and 306). The second template 307 represents the average particle activity before a small storm, in this case the data preceding disturbance 312. In a preferred implementation, the templates will typically be based on a large number of samples and thus will better characterize the data representative of a specific type of space weather event or with a non-event for a particular phase of the solar cycle.

The lower panel 309 illustrates three TEMPLATES that could be created based on time-locking to solar events and taking subsequent data for inclusion in the TEMPLATES. In this case, the three templates are associated with, again for illustrative purposes, the "time to space weather disturbance" for a particular phase of the solar cycle. Once again, in a preferred implementation, the templates would be based on a large number of samples.

CREATING SOLAR-EVENT-LOCKED TEMPLATES

Figure 5:
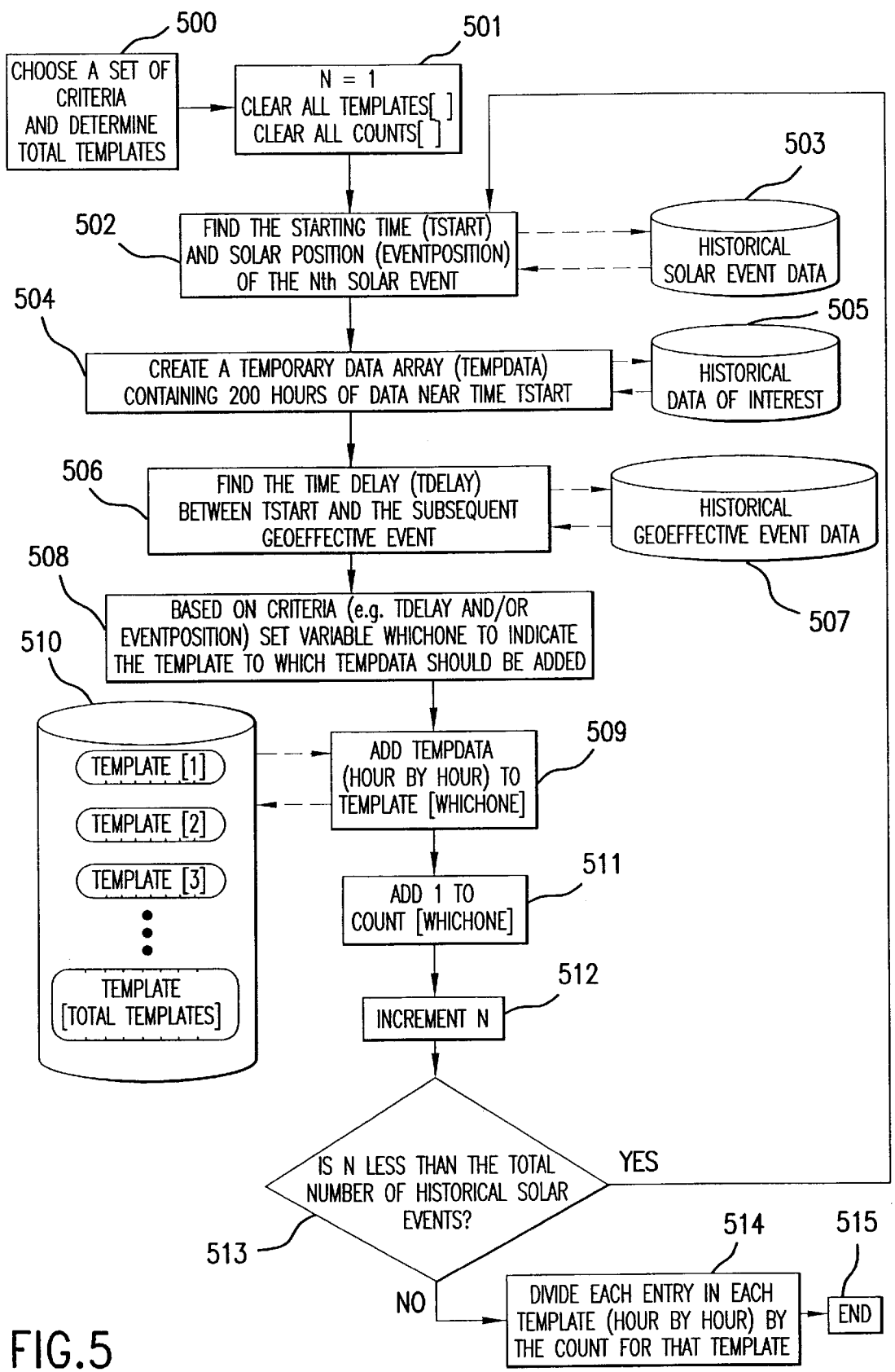
FIG. 5 is a flowchart of the software that creates the historically derived templates time-locked to solar events.

FIG. 5 illustrates the process through which a variable number of TEMPLATES are created based on time-locking to solar events. In step 500 a set of CRITERIA is chosen. This set of criteria determines the information that will be represented in each template and can be chosen in any of a number of ways. For example, one set of CRITERIA may be to classify storms into three categories based on the severity of the associated space storm (e.g., mild, intermediate, or severe). A different set of CRITERIA may be to classify solar events based on their longitude of origin (e.g. east, central, west). A different set of CRITERIA may be to classify storms into three categories based on storm duration (e.g. short, intermediate, or long duration). Yet another set of CRITERIA may be to classify storms based on their speed of arrival (e.g. fast arriving, medium arriving and slow arriving, where a fast arriving storm arrives, e.g., within 40 hours of the solar event that caused it, a medium arriving storm arrives between 41 and 80 hours and a slow arriving storm arrives more than 80 hours later). Sets of CRITERIA can be created to address any of the characteristics of space weather disturbances, including the onset time, duration, severity, position and many other parameters associated with the space weather disturbances described above. For example, another set of CRITERIA might be created to predict different size auroral ovals or other geographical regions (e.g., third radiation belt, particle fluence at the International Space Station, etc.). Additionally, multiple (or even time-varying) sets of CRITERIA and TEMPLATES may be chosen and used in parallel.

Figure 4:
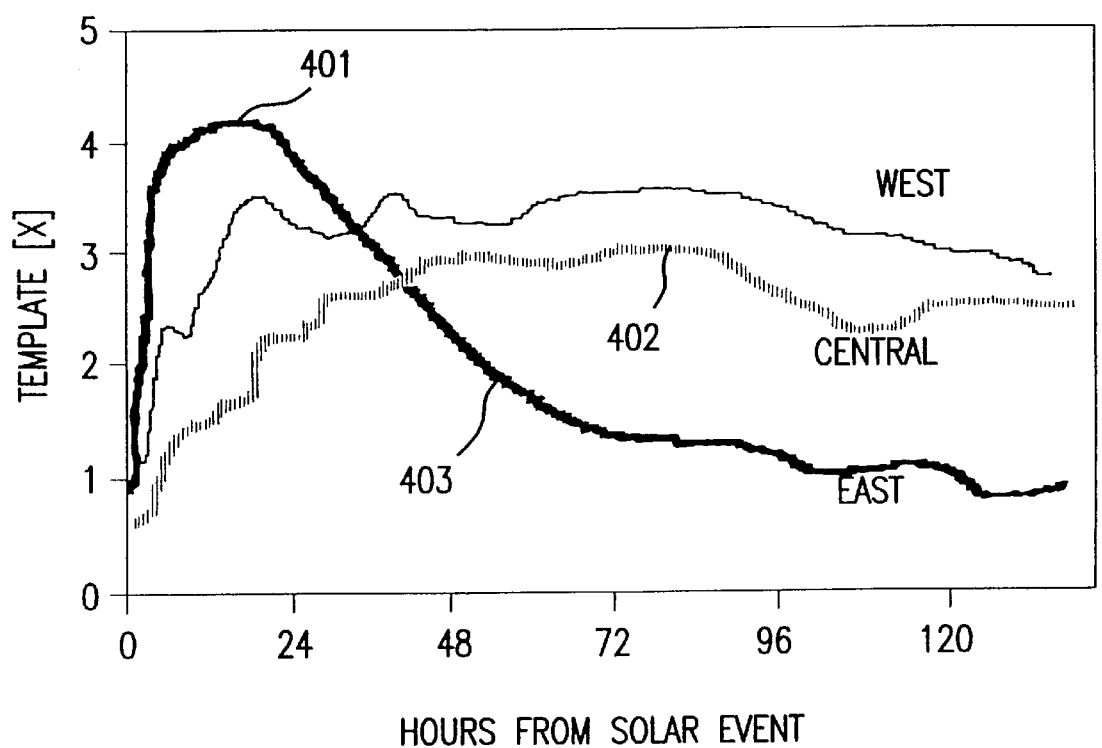
FIG. 4 is a graphical representation of three TEMPLATEs for a particular set of criteria.

The set of criteria determines the total number of templates (TOTAL TEMPLATES). Preferably, a separate template is created for each category in a set of CRITERIA for each phase of the solar cycle, i.e., a template contains a representation of data associated with the category for a particular phase of the solar cycle. In one embodiment, the set of criteria dictates that three templates are created (as shown in FIG. 4) for each phase of the solar cycle: template one (401) represents energetic particle and/or solar activity near the time that a solar event took place in the eastern longitudes of the sun (an "east" event), template two (402) represents activity near the time that a solar event took place in the central longitudes of the sun (a "central" event), and template three (403) represents activity near the time that a solar event took place in the western longitudes of the sun (a "west" event).

An alternate set of criteria could require nine templates for each phase of the solar cycle: for example, the "slow", "medium", and "fast" criteria mentioned above but each of these being further divided into three longitude-based templates (for example, there would be one template representing fast events that originated on the eastern regions of the sun, one representing fast events from the central regions of the sun, etc).

Alternatively, a template may comprise a plurality of sub-templates each associated with, for example, different types of data and/or data having a predetermined temporal relationship to data in other templates. For example, one sub-template might contain solar data before and/or during a solar event, such as x-ray, gamma, microwave, ultraviolet, etc.data, and another sub-template might represent energetic particle data during and/or following the solar event. In one embodiment, x-ray and SEP data are used in sub-templates to forecast the speed of arrival and intensity of a geomagnetic storm, including the peak particle flux.

The flowcharts described below can be easily adapted to process any of the above types of TEMPLATES.

In step 501, counter variable N is set to one and the TEMPLATES 510 (which are used to store running sums of values) are cleared to zero, as are the COUNTS (which are used to track the number of samples within each TEMPLATE).

Step 502 retrieves information regarding the Nth solar event (such as its starting time TSTART, its solar position EVENTPOSITION (i.e., where it occurred on the sun) and the phase of the solar cycle when it occurred) from a data store 503 that contains such historical information.

Step 504 fills a temporary data array, TEMPDATA (which has a format similar to the TEMPLATES illustrated in FIG. 2) by retrieving data identified in Step 502, for example, data for a time period near the time TSTART. In one embodiment, the routine takes two hundred hours of SEP data following the solar event—that is, it retrieves data for hours TSTART to (TSTART+200)—from data store 505 which contains such historical information. Alternatively, the routine might take 100 hours preceding the event and another 100 hours following the event, etc. In one preferred embodiment, 200 data values are taken such that (i) the first 100 samples are taken one-per-hour for the 100 hours following the event from one SEP energy range (e.g. flux>10 MeV) and (ii) the next 100 samples are taken one-per-hour for the 100 hours following the event from a different energetic particle energy range (e.g. flux>100 MeV). The invention however is not limited to a particular number of TEMPLATE elements, nor by a one-hour sampling, nor by the inclusion of any set number of particle measures (e.g. energy range, particle species, etc.), nor by the inclusion of a set number or type of solar measurements, nor by the chosen temporal window from which the data are collected, etc.

Step 506 determines the time TDELAY of the soonest geoeffective event after time TSTART by looking in a database 507 containing geoeffective event data. Typically, due to considerations of reasonable event speed, only events more than 20 hours and less than 120 hours are taken as viable candidates for the "soonest" event. Depending on the set of CRITERIA chosen in step 500, step 506 may be optional (e.g. if the CRITERIA does not use TDELAY as a basis for event classification and TEMPLATE generation).

Step 508 applies the CRITERIA condition to the relevant variables (e.g.

TDELAY, EVENTPOSITION, solar cycle phase, etc.) and sets variable WHICHONE to indicate the template to which the TEMPDATA should be added.

In step 509 TEMPDATA is added to TEMPLATE [WHICHONE] on an hour by hour basis—i.e. hour 1 of TEMPDATA is added to hour 1 of TEMPLATE [WHICHONE], hour 2 of TEMPDATA is added to hour 2 of TEMPLATE[WHICHONE], and so on. After the data have been added, COUNT[WHICHONE] is incremented by one in STEP 511. In one preferred embodiment, COUNT [WHICHONE] has an additional dimension so that a count can be kept for each hour in each TEMPLATE. This additional dimension does not change the logic of the algorithm, but it does allow the routine to handle data gaps (in which case nothing is added to that particular element of the TEMPLATE and the COUNT[WHICHONE][HOUR] is not incremented). Furthermore, the additional dimension allows an operator to assign (either by eye or algorithm) a "confidence" measure to each element of TEMPDATA and adjust COUNT[WHICHONE][HOUR] accordingly. For example, if the first 21 hours of data following a solar event are clearly contaminated by a preceding storm (or a machine error) then these data can be kept out of the TEMPLATE and elements COUNT[WHICHONE][0] through COUNT[WHICHONE] [20] would not be incremented.

In step 512, N (the counter used to index the Solar Event that is being examined) is incremented. In step 513, N is compared to the total number of historical solar events and if there are still more events to consider, control passes back to step 502. If all events have been considered, then step 514 is performed in which each TEMPLATE is divided by its respective COUNT (to yield averages). If, as mentioned above, there is an additional dimension to the COUNT array, then each element of each TEMPLATE is divided by its respective COUNT (on an entry-by-entry basis). The process then ends in step 515 at which point the TEMPLATES have been created.

CREATING SPACE-WEATHER-LOCKED TEMPLATES

Figure 6:
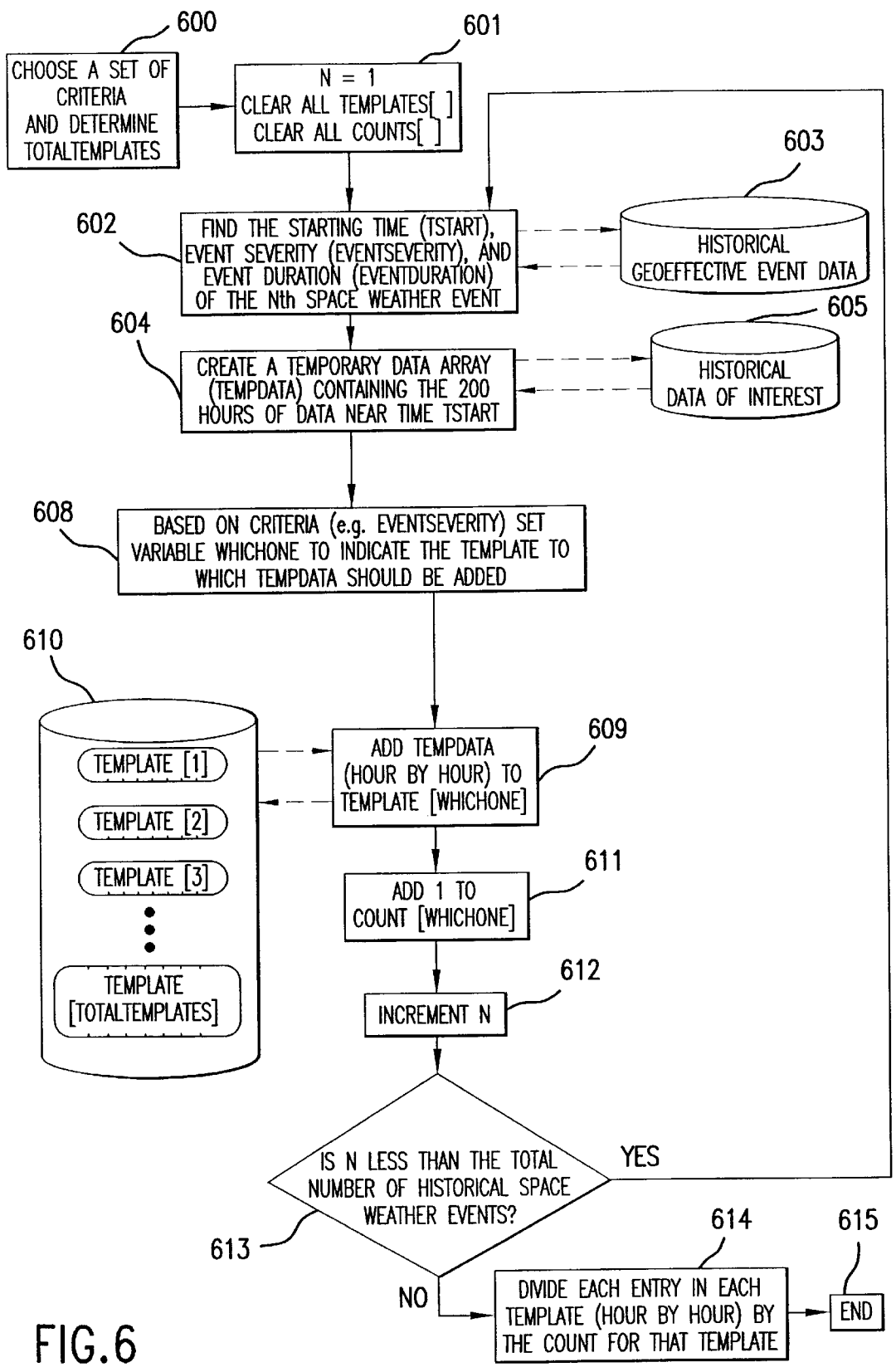
FIG. 6 is a flowchart of software that creates historically derived templates time-locked to space weather disturbances.
Figure 7:
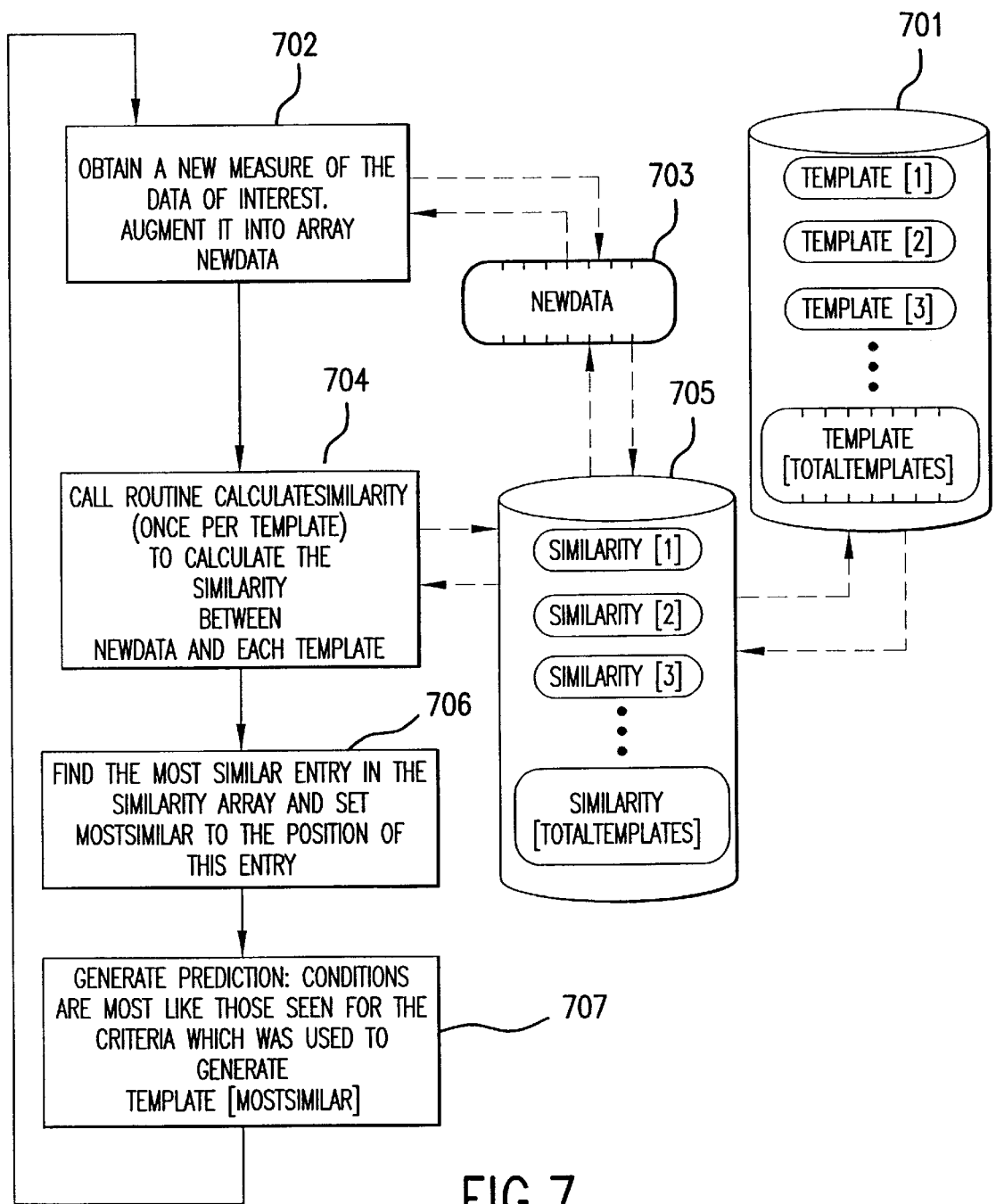
FIG. 7 is a flowchart of software that predicts the onset of a solar-induced event based on comparisons of incoming SEP and/or solar data with historically-derived templates.

FIG. 6 illustrates the process through which a variable number of TEMPLATES are created based on time-locking to a space weather disturbance. In step 600 a set of CRITERIA is chosen. Again, this set of criteria determines the information that will be represented in each template and can be chosen in any of a number of ways as described in connection with FIG. 5 above.

The set of criteria again determines the total number of templates (TOTALTEMPLATES). Templates may be created which represent average activity both before and after an event—the 'after the event' data may be useful for predicting phenomena such as the lowering of the ionosphere, the creation of radiation belts, etc.

In step 601, counter variable N is set to one and TEMPLATES and COUNTS are cleared to zero.

Step 602 retrieves information regarding the Nth space weather disturbance (such as its starting time TSTART, the severity of the disturbance, EVENTSEVERITY, the duration of the disturbance, EVENTDURATION, and/or the phase of the solar cycle at the time of the disturbance) from a data store 603 that contains such historical information.

Step 604 fills a temporary data array, TEMPDATA, by retrieving historical data of interest for a time interval near TSTART. For example, this step might include the two hundred hours of SEP data and solar data preceding the space weather disturbance (that is, for example, it retrieves data for hours (TSTART–200) to TSTART from a data store 605 containing such historical information. In one preferred embodiment, the 200 samples are taken such that: (i) the first 100 samples are taken one-per-hour from one SEP energy range (e.g. flux>10 MeV), and (ii) the next 100 samples are taken one-per-hour from a different SEP energy range (e.g. flux>100 MeV). Again, the invention is not limited by this particular number of TEMPLATE elements, nor by the one-hour sampling, nor by the inclusion of any set number of SEP or solar measures.

Step 608 applies the CRITERIA condition to the relevant variables (e.g. EVENTSEVERITY or EVENTDURATION) and determines the template to which the TEMPDATA should be added. Variable WHICHONE is set accordingly.

In step 609, TEMPDATA is added to TEMPLATE [WHICHONE]. This addition happens hour by hour such that hour 1 of TEMPDATA is added to hour 1 of TEMPLATE[WHICHONE], hour 2 of TEMPDATA is added to hour 2 of TEMPLATE[WHICHONE], and so on. After the data have been added, COUNT [WHICHONE] is incremented by one in step 611. In one preferred embodiment, COUNT[WHICHONE] has an additional dimension as described in connection with FIG. 5 so that a count can be kept for each hour in each TEMPLATE.

In step 612, N (the counter used to index the space weather disturbance that is being examined) is incremented. In step 613, N is compared to the total number of historical space weather disturbances and if there are still more disturbances to consider, control passes back to step 602. If all disturbances have been considered, then step 614 is performed in which each TEMPLATE is divided by its respective COUNT (to yield averages). If, as mentioned above, there is an additional dimension to the COUNT array, then each element of each TEMPLATE is divided by its respective COUNT (on an entry-by-entry basis). The process then ends in step 615 at which point the space weather disturbance locked TEMPLATES have been created.

GENERATING PREDICTIONS USING THE TEMPLATES

Once the set of TEMPLATES has been created, these TEMPLATES can be used to generate space weather predictions. New data are compared to the TEMPLATES for the current phase of the solar cycle and whichever TEMPLATE is most similar is then used to generate a prediction. If, for example, the new data are most similar to the TEMPLATE representing a severe storm, a warning will be issued that a severe storm may be approaching.

FIG. 7 illustrates the process by which such predictions are generated. In step 702 new measures of SEP or other activity are obtained from one of the data sources depicted in FIG. 1 (spacecraft 102, internet 103, ground-based observatories 104, data storage 105, human entry 106, or models 107). The value (or values) are then stored in a data array, NEWDATA, 703. Each new data value is shifted into NEWDATA array 703—i.e., the first value in NEWDATA is removed, all the entries in NEWDATA are shifted "forward" one position (thus the second value will fill the position previously occupied by the first value, etc.), and then the newest value is placed into the newly-vacated "last" position in the NEWDATA array. Alternatively, if the TEMPLATES contain sub-divisions (e.g. the first 50 values are from a different energy range than the next 50 values), then the storage of new data takes place in the same fashion within each sub-division.

Figure 8:
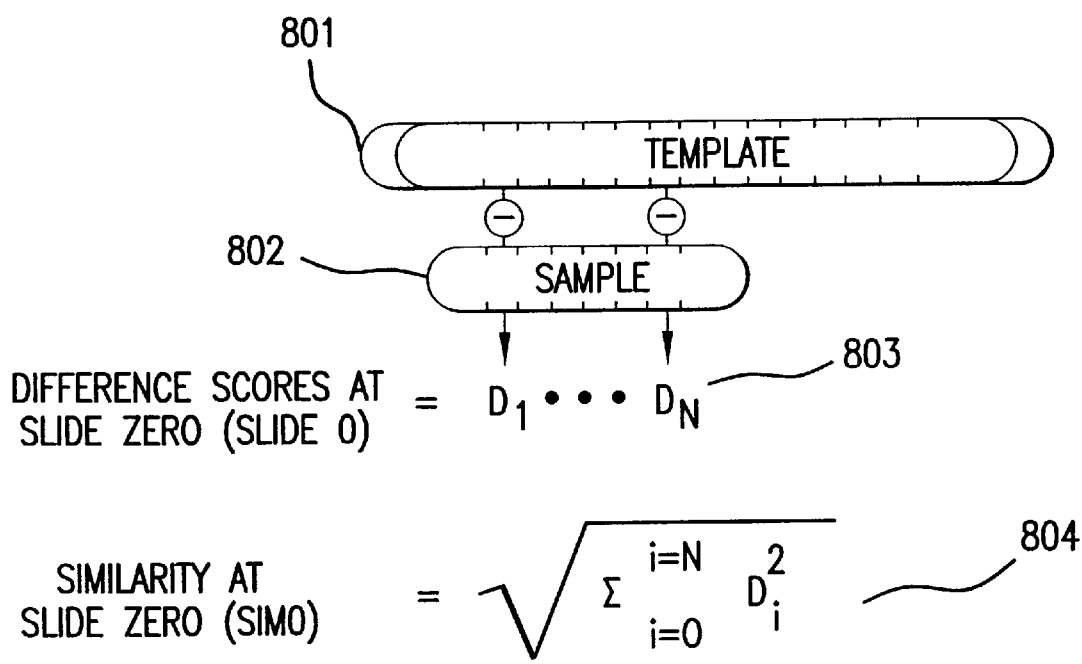
FIG. 8 depicts a type of similarity measure (Euclidian Distance calculations) that can be used when predicting solar-induced events.
Figure 9:
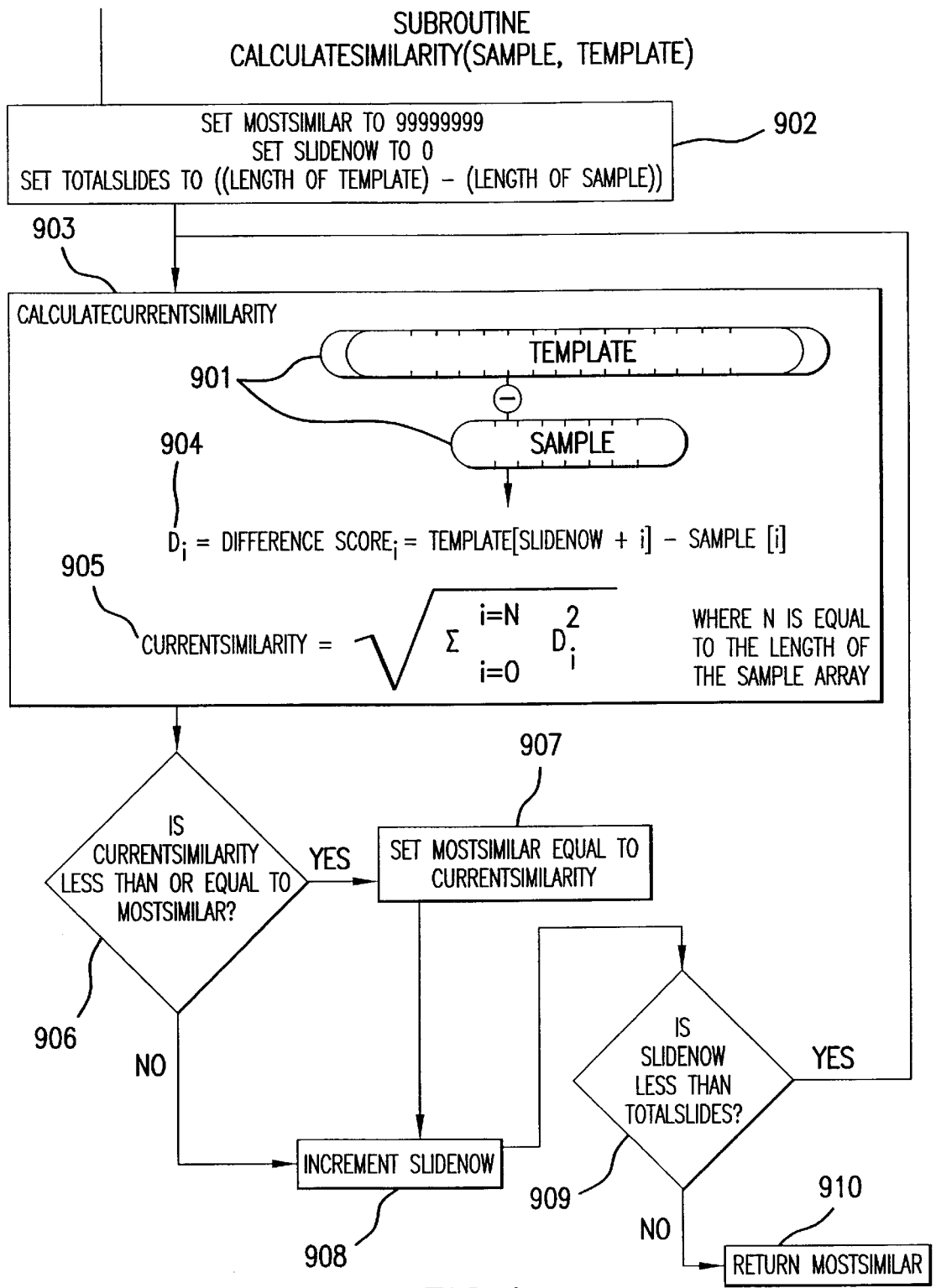
FIG. 9 illustrates a general subroutine implementing one type of similarity measure (Euclidian Distance calculations) that can be used when predicting solar-induced events.

Processing continues in step 704, which calculates a SIMILARITY measure between NEWDATA and each of the TEMPLATES for the current phase of the solar cycle. The SIMILARITY measures 705 can be calculated, for example, in any of the following ways:

- by calculating the Euclidean distance between NEWDATA and each TEMPLATE (as illustrated in FIGS. 8 and 9),
- by calculating the well-known Pearson correlation-coefficient between NEWDATA and each TEMPLATE,
- by calculating the variance-covariance similarity between NEWDATA and each TEMPLATE (a statistical technique which is well-known by those skilled in statistics and which takes into account not only the average values in each template, but also the standard deviations or variances of these values across template elements),
- by using any conventional recognition/comparison algorithm (such as neural networks or other statistical metrics).

Once all the SIMILARITY measures are obtained, processing continues at step 706, which sets the variable MOSTSIMILAR to the most similar entry (either the greatest or smallest value depending on the technique used to calculate the SIMILARITY scores).

The variable MOSTSIMILAR indicates which TEMPLATE is most similar to the current NEWDATA sample. In step 707, a prediction is generated. This prediction will, for example, be of the form: "Current conditions are most like those that are represented by [TEMPLATE [MOSTSIMILAR]]." Using the "fast", "medium", and "slow" CRITERIA mentioned above, the prediction could be expressed more idiomatically as: "WARNING: Current conditions are most like a FAST arriving event—expect a geoeffective event within the next 40 hours!" Once this prediction has been generated, control passes back to step 702. This process remains the same for both time-locking to space weather disturbances and solar events, though the nature of the prediction may be different. Alternatively, (i) a prediction may be generated only if it differs from the last prediction generated, (ii) the prediction may be based on some number of previous predictions or (iii) the prediction may be based on the most severe of some number of previous predictions.

After a prediction has been generated and some time has passed, it is possible to evaluate the accuracy of the prediction and dynamically modify the forecasting system. This can happen in several ways. In one way, as more data are obtained which fit one of the TEMPLATE criteria, the new data are added into the TEMPLATE representation(s) (i.e. as, over time, "new data" become "historical data", they are added into the historically-derived templates). Other, more complex, techniques for dynamic system modification are possible. For example, if a prediction is generated and, in hindsight, it is found to be incorrect, the TEMPLATE representation that led to the poor prediction may be examined and the data most responsible for issuing the prediction identified. These data can then either be modified or, alternatively, they could be flagged as "problematic." Through such flagging, the confidence of future predictions that rely on these data could be lowered.

A SAMPLE SIMILARITY-CALCULATION SUBROUTINE

FIG. 8 depicts a calculation of Euclidian distance which can be used as a similarity score. Again, one skilled in the art will appreciate that many other techniques can be used to obtain a similarity measure. Numeral 801 identifies a TEMPLATE to which a new sample 802 will be compared. For each element in the sample (1 through N, where N is the length of the sample), a difference score 803 is obtained. This difference score is simply the difference between each sample element and the matching (or respective) element in the TEMPLATE. Once these difference scores have been calculated, the measure of similarity 804 is obtained by squaring all the difference scores and then summing them (and taking the square root of this sum of squared differences).

FIG. 9 depicts an alternative embodiment which compensates for situations in which the data at the beginning of a TEMPLATE are not in fact associated with the CRITERIA. To compensate for this situation, the samples (or, equivalently, the TEMPLATES) may be "slid" through time to find the best match. In step 902, variable MostSimilar is set to a very large number (here shown as 99999999), variable SlideNow is set to zero, and TotalSlides is set to ((Length of Template)—(Length of Sample)). In step 903, a set of difference scores 904 is obtained and the CurrentSimilarity 905 is calculated.

The value of CurrentSimilarity is then compared in step 906 to MostSimilar and, if it is smaller (e.g., a closer Euclidian distance), MostSimilar is set equal to CurrentSimilarity in step 907. In either case, step 908 is performed in which SlideNow is incremented. SlideNow is then compared to TotalSlides in step 909 and, if there are more slides remaining, control passes back to step 903. Once all the slides have been completed, the routine returns the value MostSimilar 910. The value of MostSimilar will, upon completion of the routine, be the smallest Euclidian distance between the Sample and the Template across all possible temporal slides.

In another embodiment, the well-known statistical technique of variance-covariance distances is used to calculate the MostSimilar value. In this technique, when the TEMPLATES are initially created (via averaging the individual samples), it is not only the average values that are saved, but also a measure of the variance at each point in time. The routine shown in FIGS. 8 and 9 can then use the variance-covariance technique to compare a new sample (i.e. the NEW DATA) to each of the TEMPLATES. Similarly, other measures of confidence, certainty, or reliability can be used (e.g., agreement with previous predictions, etc.). For example, confidence levels can be determined by the percentage of previous instances of similar observations and forecasts that turned out to be valid. Thus, if 90% of the time, previous forecasts turned out to be accurate, then the degree of confidence could be 90% (or, equivalently, 0.9). However, unlike the Euclidian method that simply returns the Euclidian distance between the new sample and the average, the variance-covariance technique returns this distance in terms of the number of standard deviations from the average. Therefore, the variance-covariance technique is essentially a multidimensional generalization of such standard statistical techniques as the well-known t-test statistic. This technique generates similarity estimates that take into account not only the average data, but also the dispersion of the data and therefore it tends to give somewhat better estimates.

Because a numerical calculation is used to compute the similarity between the new data and the stored representations, it is possible to obtain confidence measures of each prediction. For example, the variance-covariance method returns the number of standard deviations from a template. This can be used as a measure of confidence of the prediction. In particular, if the current data are only 0.01 standard deviations from the most similar template representation, then the system has more confidence in the prediction than if the data were 12.8 standard deviations from the most similar template. Such measures of confidence could either be displayed along with the warning or, as is often the case, if the template-prediction is a part of a larger (hybrid) forecasting system (e.g. if several sets of templates are operating in parallel, or if the templates are operating in parallel to a neural network such as described below), then the weight of each template in the final prediction could be a function of the calculated prediction-confidence.

A SAMPLE HYBRID TEMPLATE-BASED SYSTEM

Figure 10:
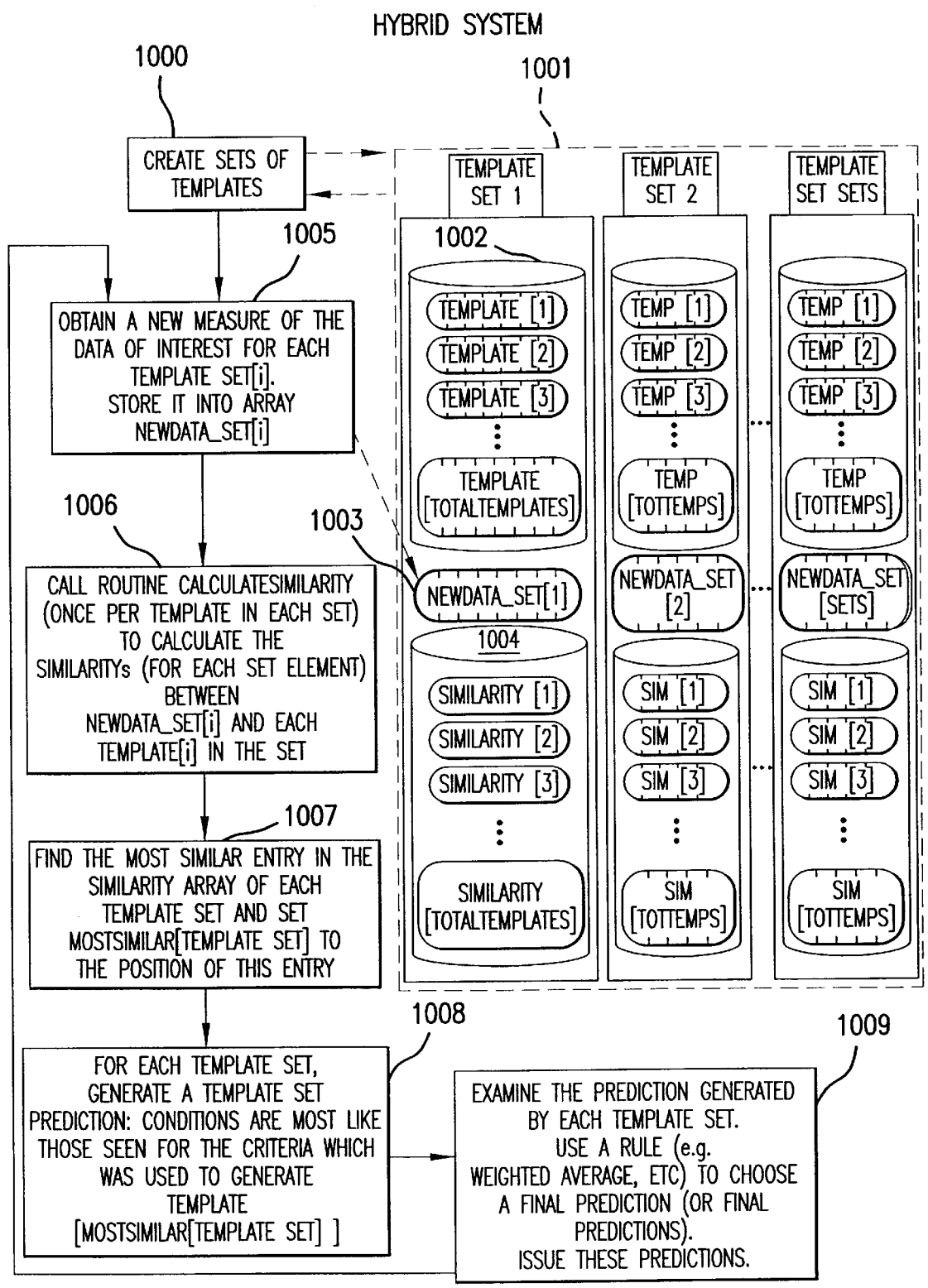
FIG. 10 illustrates a hybrid space weather prediction system where information from both solar-locked and storm-locked templates are combined to increase forecast accuracy.

FIG. 10 illustrates how a hybrid template system operates. Such a system is designed to use multiple sets of TEMPLATES, each operating in parallel, to increase forecasting accuracy. For example, it might use three types of solar-event-locked and two types of space-weather-disturbance-locked TEMPLATES to generate space weather predictions about both storm onset and storm properties (e.g. severity and duration). Alternatively, the TEMPLATES in one embodiment include a TEMPLATE for x-ray data and a TEMPLATE for SEP data. The TEMPLATES may also be associated with temporally separated data with, for example, data in an x-ray data TEMPLATE being earlier in time than the data in the SEP data TEMPLATE.

In step 1000, a variable number of TEMPLATE SETs 1001 are created. Each TEMPLATE SET has associated with it a variable number of TEMPLATES 1002, an array into which new data are stored 1003, and a variable number of SIMILARITY measures 1004. As new data are obtained in step 1005, the appropriate values are stored in each NEWDATA_SET. Next, in step 1006, for each TEMPLATE SET, each NEWDATA_SET[i] is compared to the corresponding TEMPLATE[i] and similarity measures are obtained 1006. In step 1007, the SIMILARITY measures are examined for each TEMPLATE SET and position [TEMPLATE SET] of the array MOSTSIMILAR is set to the most similar TEMPLATE. After step 1007 is complete, the array MOSTSIMILAR will indicate, for each TEMPLATE SET, which TEMPLATE in that SET is most similar to the new data. In step 1008, for each TEMPLATE SET, a prediction is generated based on the MOSTSIMILAR array. At this point, the algorithm has many possible predictions and it must choose a FINAL PREDICTION to issue in step 1009. This FINAL PREDICTION may be generated in any number of ways. For example, if all the TEMPLATE SETS are generating arrival-time predictions (e.g. based on solar-event locked data), then the FINAL PREDICTION could be either an average of each TEMPLATE SETS prediction or, in another embodiment, the "worst case" prediction is generated (i.e. the shortest arrival time prediction is output). Alternatively, if the variance-covariance similarity measure is used, then the distances (in standard deviations) can be used to choose between multiple predictions. Similarly other measures of confidence, certainty or reliability can be used (e.g., agreement with previous predictions, etc.). However, if some of the TEMPLATE SETS are estimating arrival time (e.g. based on solar-locked TEMPLATES) and others are estimating solar disturbance intensity, then two separate predictions might be generated. In general, the logic of this FINAL PREDICTION step 1009 will be based on the particular TEMPLATES within the TEMPLATE SETS.

In one preferred embodiment, multiple templates are created as described above. However, in this embodiment, multiple sets of templates are created for specific starting conditions. For example, one set of templates is created based on historical data taken from periods of high solar activity (e.g. during solar max). A separate set of templates is created based on historical data taken from periods of low solar activity (e.g. during solar min). Once these multiple sets have been created, current predictions are made by comparing current data to the elements in the appropriate template set. By using this dynamic approach to weather prediction (wherein the particular templates used are a function of recent or cyclical variations in activity, such as, but not limited to, the phase of the solar cycle) the overall accuracy of the forecasts is increased. Similar multiple sets of templates are created for other starting conditions as well (e.g. a template set could be created that represents activity following a large solar flare, or following large x-ray bursts, etc.). In essence, this approach is an extension of the CRITERION discussed in the template-creation phase. However, instead of the CRITERION being applied to all data, this "STARTING CONDITION CRITERIA" is used as a first-filter which allows a template-set to be created for specific starting conditions.

Expert System Embodiment

In this embodiment, an expert system is used to recognize complex patterns in SEP and other data indicative of particular types of space weather disturbances for a particular phase of the solar cycle. For example, a "peak" in energetic particle activity, i.e., a time-varying pattern that goes, roughly speaking, low—high—low, with characteristics possibly dependent on the current phase in the solar cycle may indicate the approach of a geomagnetic storm.

Figure 11:
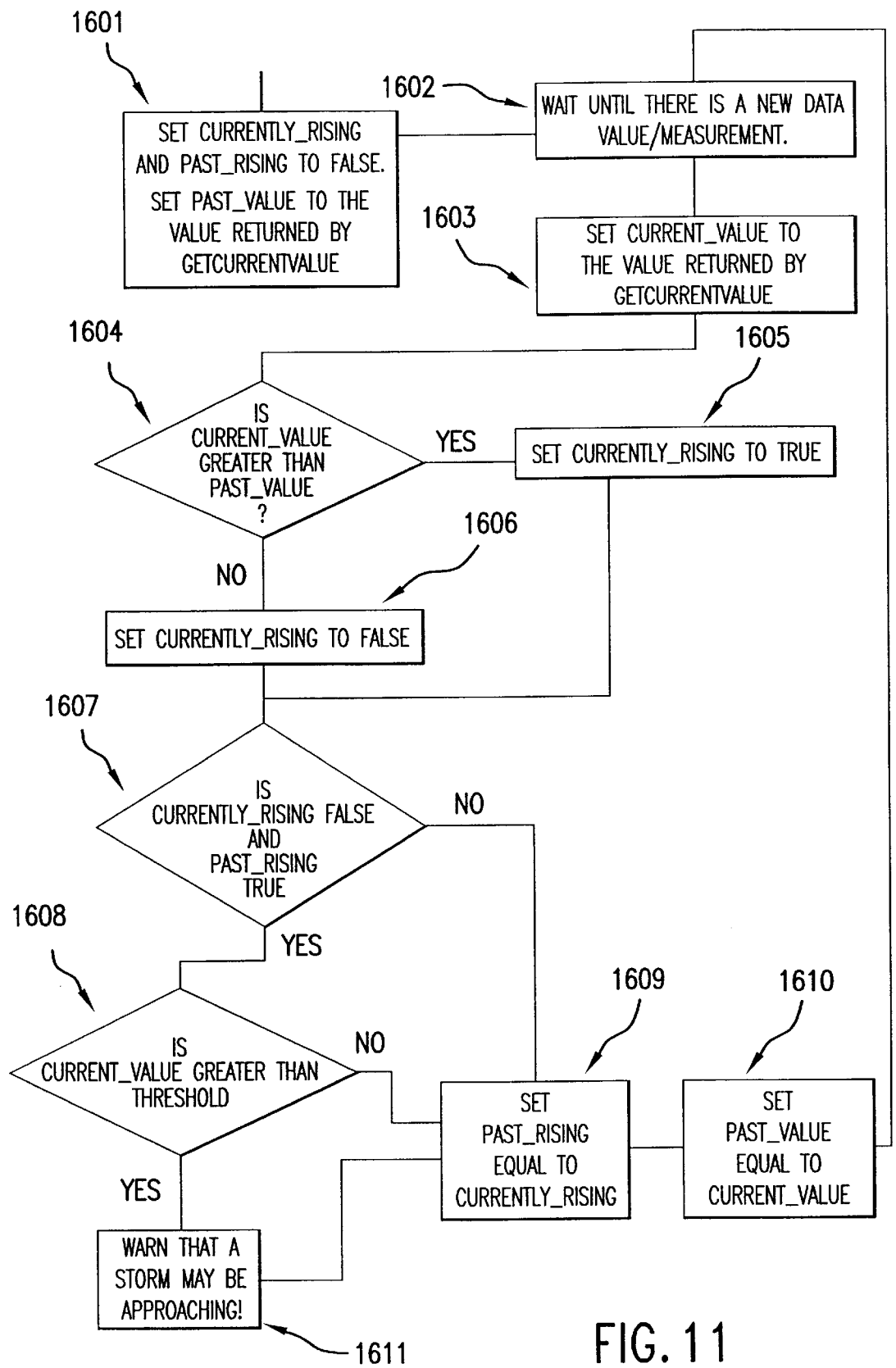
FIG. 11 is a flowchart of software for an expert system that generates space weather predictions.

Referring to FIG. 11, the variables CURRENTLY_RISING and PAST_RISING are initially set to zero in step 1601. All energetic particle and other data values are returned by a routine called GetCurrentValue (described below). Initially, the data value returned from that routine is stored in PAST_VALUE (step 1601).

In step 1602, the process pauses until a new data value or measurement has been acquired. These values can be obtained from, for example, any of the sources indicated in FIG. 1. The data may include, e.g., SEP data, measures of x-ray intensity, measures of magnetic field components, helioseismologic parameters, optical data, etc.

As noted above, SEP data are often measured in different energy-ranges, e.g., >1 Mev, >2 Mev, >4 MeV, >10 MeV, >30 MeV, and >60 Mev. Within each energy range a measurement is made of the number of particles arriving per square centimeter per steradian per second. The present algorithm can operate on any or all of these energy ranges or, alternatively, on any combination or derived energy ranges (e.g. 2–5 MeV, log(4–10 MeV), Fourier components of 2–5 MeV, etc.).

Once new data values are obtained, CURRENT_VALUE is set to the value returned by GetCurrentValue (step 1603). CURRENT_VALUE is then compared to PAST_VALUE (step 1604). If the current value is larger than the PAST_VALUE then CURRENTLY_RISING is set to true (step 1605), otherwise CURRENTLY_RISING is set to false (step 1606). Next, the occurrence of a peak is determined by checking if CURRENTLY_RISING is FALSE and PAST_RISING is TRUE (step 1607). If this is the case, then the CURRENT_VALUE is compared to THRESHOLD (step 1608). If CURRENT_VALUE is greater than the THRESHOLD value then a storm is predicted to occur sometime within the next 72 hours (step 1611). THRESHOLD value is selected based on the type of data being analyzed and possibly on the current phase of the solar cycle. In addition, multiple versions of the routine illustrated in FIG. 11 may be run on different SEP and solar data and a storm may be predicted based on the results of these multiple routines. For example, in one embodiment, a storm is predicted based on the detection of a rise in x-ray data above a certain THRESHOLD or a peak in the x-ray data above a certain THRESHOLD followed by a rise or peak in SEP again above a certain THRESHOLD. Next, PAST_RISING is set to CURRENTLY_RISING (step 1609) and PAST_VALUE is set to CURRENT_VALUE (step 1610). Operation is then passed back to step 1602.

Figure 12:
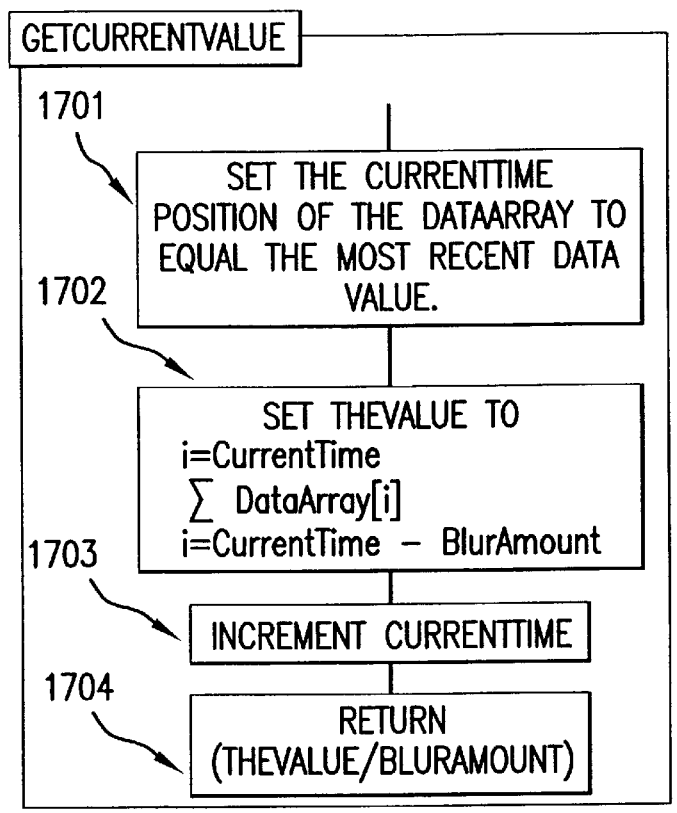
FIG. 12 is a flowchart of the GetCurrentValue routine that is used by the peak-finding expert system.
Figure 13:
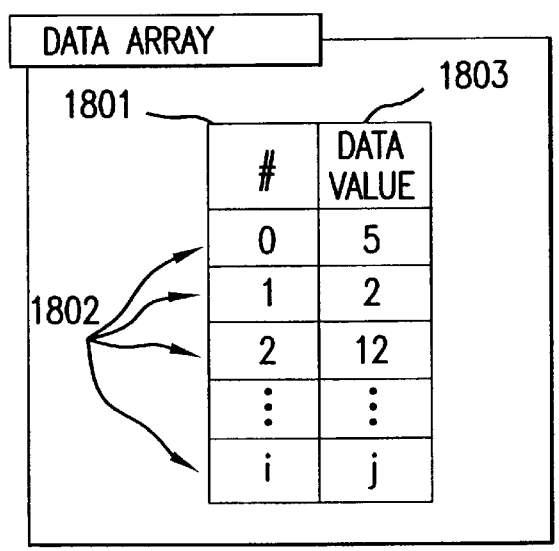
FIG. 13 depicts a data array that is used to store data (SEP, solar, etc.) for the peak-finding expert system.

The routine GetCurrentValue is illustrated in FIG. 12 and uses three variables/datastructures: DataArray, CurrentTime and BlurAmount. DataArray is an array similar to that shown in FIG. 13. Each element in array 1801 contains an index number 1802 and a data value 1803. The data values 1803 stored in this array may be, for example:

1) measurements of the entire energy range (e.g. 0–10,000 MeV),
2) a bandpass region from such measurements as in 1, or
3) a linear or nonlinear combination of such measurements as in 2.

CurrentTime is a value which is used to increment the index to DataArray. BlurAmount is used to indicate how many data values should be averaged together before returning a value. In FIG. 12, the averaging is implemented as a simple unweighted averaging. However, it should be understood that any weighted form of averaging can be used here.

The routine GetCurrentValue operates as follows. In step 1701, the element of the DataArray at index CurrentTime is set to the most recent data value. Next, in step 1702, the variable The Value is set to the sum of the BlurAmount most recent data values. Then the variable CurrentTime is incremented (step 1703). Finally, the routine returns TheValue divided by BlurAmount (i.e. the average) (step 1704).

Figure 14:
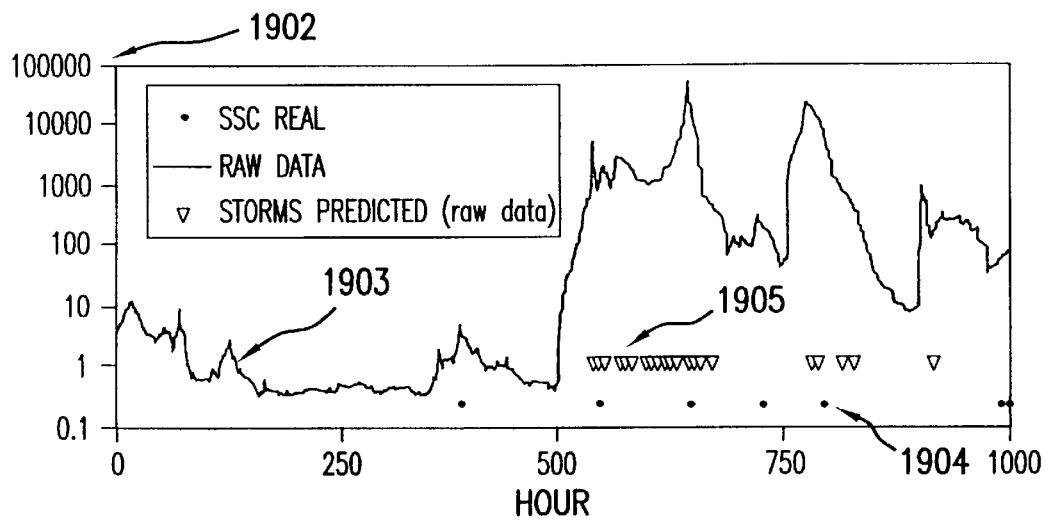
FIG. 14 illustrates forecast results of an expert system in accordance with the present invention using different blur amounts.
Figure 14:
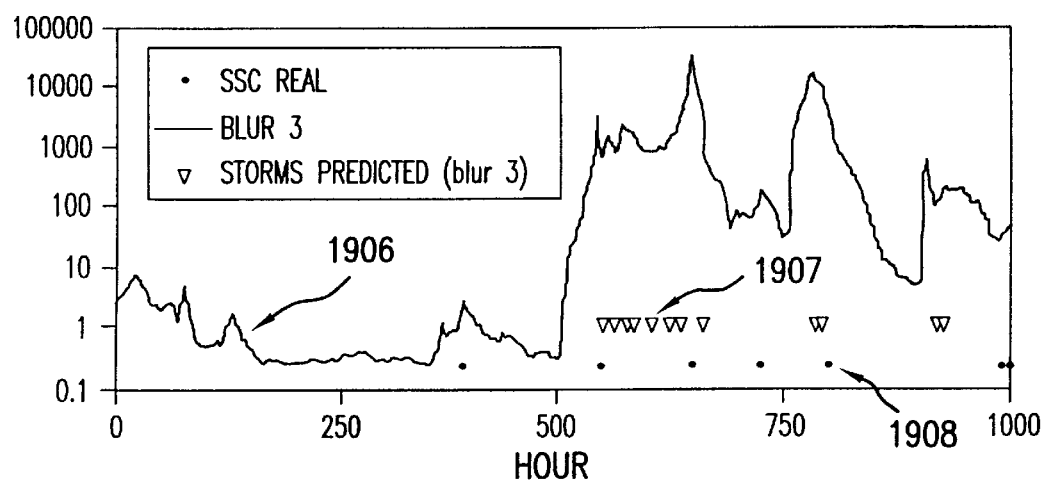
Figure 14:
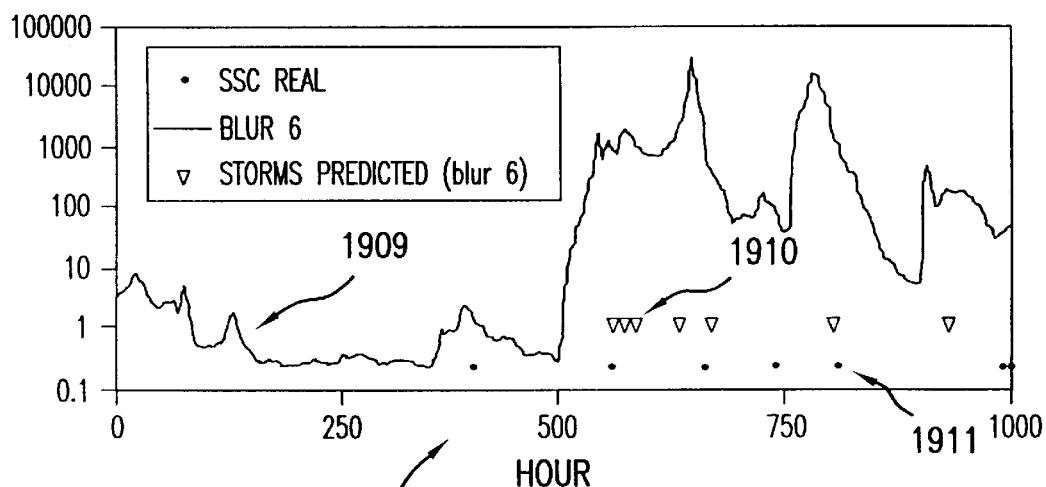

Results of the GetCurrentValue routine for different BlurAmounts are depicted in FIG. 14, using energetic particle data as the data of interest. The x-axes 1901 in the three graphs presented in this figure all represent hours and the y-axes represent the log of energetic particle measurements of particles having energy greater than 1 Mev (number/(cm-square) sec sr). The data values were taken, for illustrative purposes, from a period beginning in March, 1991.

In the top graph, the raw (unprocessed and therefore not averaged) values of energetic particles are graphed 1903.

The small circles 1904 indicate times when sudden commencements actually occurred (i.e. times when there were extreme space storms). The predictions from the invention are indicated by small upside down triangles 1905. These predictions were obtained using a threshold of approximately 200. Although some of these predictions are rather accurate, there are clearly many false-alarms (i.e. the algorithm is too liberal and predicts storms when none were actually occurring).

In the middle graph of FIG. 14 the data are again plotted 1906, but this time the BLURAMOUNT is set to three hours. Thus, each point on curve 1906 is really the average of three successive hours found on curve 1903. In this middle graph the predictions 1907 and actual storms 1908 are again indicated. There are fewer false alarms in this case than in graph 1903.

Finally, in the bottom graph, the energetic particle data values are plotted 1909 with a BLURAMOUNT of 6 hours. Again, the predicted storms 1910 and actual storms 1911 are indicated. Compared to both the top and middle graphs it is clear that using this larger amount of blur has decreased the number of false alarms.

In contrast to the present invention, one skilled in the art will appreciate from FIG. 14 that prior techniques that look only at fluxes over a certain threshold might issue warnings that a storm is coming over a long period of time representing several distinct storms. For example, for the data represented in FIG. 14, if the threshold was 10, a system based only on a threshold would issue a warning continuously from approximate hours 500 to 900, even though that period encompassed four distinct storms.

An expert system in accordance with the present invention is not limited to various forms of peak detection. Similarly, expert systems could be based on linear or non-linear time-series forecasting techniques. For example, in an alternate embodiment, the expert system (1) examines the current or recent space weather conditions, (2) calculates the variation (e.g. standard deviation) of SEP counts over a recent time interval; (3) calculates (a) the number of hours since the last storm and (b) the number of hours since the storm before the last storm; and determines the time until the next storm based on the results of (1), (2), and (3). This prediction is made by comparing the current SEP variation and time-between-storms to historically-derived distributions of these values in space weather conditions similar to the current conditions. For example, a distribution might be created which consists of the time-between-events on the x-axis and the number of times that this temporal delay was observed on the y-axis. Several variants of this basic distribution can be created: one that is based on historical data following solar events by less than 200 hours, another based on historical data following solar events by 200–400 hours, etc. Once the distributions have been created, the choice of which distribution to use for the current data is made (based on the results of (1) above) by examining the current or recent space weather conditions. Once this selection is made, it is possible to derive the most-likely time-to-event from this distribution by using standard (and well-known) statistical techniques. The degree of confidence in this forecast could be based on historically similar observations and forecasts as the percent of forecasts that were issued and then validated.

Other expert systems combining several rules have been used in alternate embodiments of the present invention. For example, rules that analyze the time varying profiles of SEPs have been found to improve predictions; in particular, rules analyzing the rise times of fluxes in different energy channels, changes in the $He^3/He^4$ ratio, and comparisons of rise times of proton fluxes, electron fluxes, alpha fluxes and other ion species in different energy channels. As in the case of the previous embodiment, the final prediction may be generated in a number of ways. It could be either an average of each of the expert predictions or a "worst case" prediction, etc. As in the case of the previous embodiment, the final prediction may be generated in a number of ways (e.g. via a "worst case" technique, via a weighted sum of subsystem predictions, via a weighting based on recent predictions, etc).

Also, as in the template-based embodiment, the expert system embodiment allows for a quantification of the confidence of a prediction. For example, in a preferred embodiment that utilizes rules regarding peak-detection, the confidence level of a prediction can be obtained by several means such as (1) via a function that compares the current peak size to other peaks in the recent past, (2) via a function that examines the correlation between the current peak and recent solar activity, (3) via a function that quantifies the Fourier power of the current peak, etc. Once the confidence level of a prediction has been quantified, it can be displayed as part of the output of the prediction system. Or, if as may be the case, the expert system is a part of a larger (hybrid) forecasting system (e.g. if several sets of rules are operating in parallel or if the expert system is operating in parallel with a template based system, etc), then the weight of the expert system prediction in the final (overall) prediction could be a function of the calculated prediction-confidence.

Neural Network Based Embodiment

Figure 15:
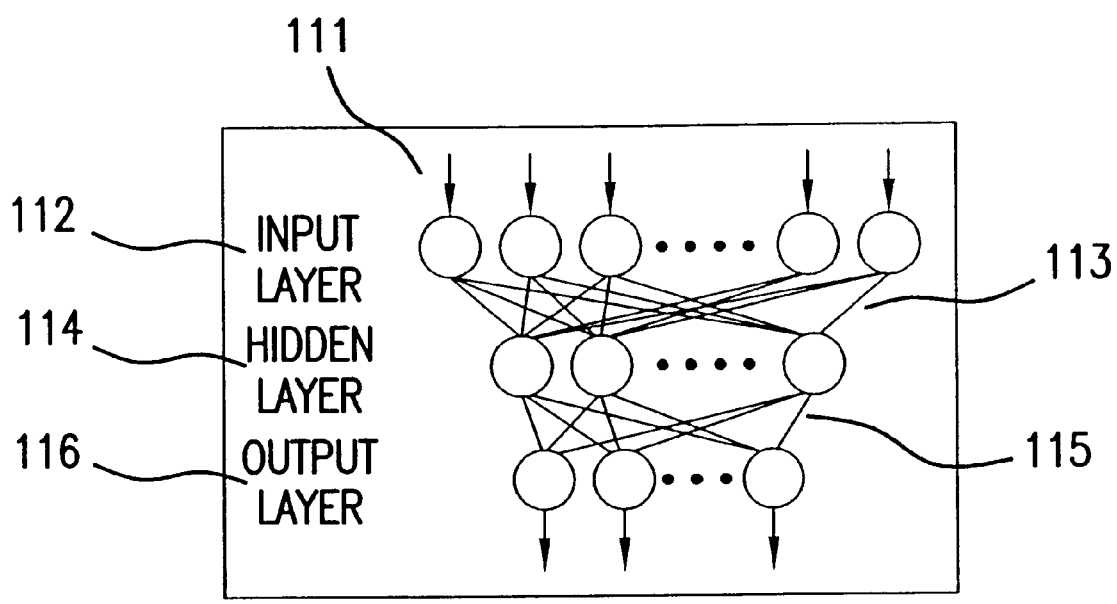
FIG. 15 illustrates a three-layer neural network.

FIG. 15 shows an example of a simple three-layer neural network 111 comprising an input layer 112, a hidden layer 114, and an output layer 116. Neural network input data are of a vector form (i.e. each data point is actually an ordered series of numbers). These data are fed into the network 111 by setting the values of the nodes in the input layer 112. Activity then flows through the network via the connections 113 that link each node in the input layer 112 to each node in the hidden layer 114. Each of these connections has a weight associated with it such that the amount of activation flowing through any particular connection is actually the product of that connection's weight and the value of the input node. The amount of activation of any node in the hidden layer will either be the sum of the weighted connections feeding into that node or, for example, the sum of the weighted connections fed through a threshold function (such as a sigmoidal weighting function). Information flow continues in a similar fashion from the hidden layer 114 to the output layer 116 through a set of weighted connections 115.

A neural network (like the one shown in FIG. 15) is a sophisticated way of mapping one set of vectors (the input vectors) into another set of vectors (the output vectors). However, for this mapping to be useful, the neural network must first be trained. This training consists of making small changes in the weights and/or thresholds of the neural network. After the training is complete, the neural network should perform the desired mapping. Although many different techniques can be used to train a neural network, most of them rely on the same logic: (i) a set of input-output pairs are obtained (this is the "training set"), (ii) each input is fed into the neural network and the resulting output is compared with the desired output, and (iii) based on the results of this comparison changes in the weights and/or thresholds are made to reduce the error between the obtained and the desired output. This input-output training continues until the error rate has been reduced to acceptable levels. Thus, the first step in using a neural network involves the creation of the input-output pairs that are used to train the network. The neural network training could be based on back propagation or on other training techniques (for example, on Hebbian or self-organizing methodologies). Implementing a neural network is known and will not be described in detail herein.

The ability of a neural network to accurately forecast space weather depends in part on defining the correct data to use as input and output vectors in the training set. The present invention, unlike past neural networks for predicting or classifying space weather, is trained, in one embodiment, using three or more SEP data points and the phase of the solar cycle as input parameters. In other embodiments, the neural network is, for example, additionally trained using combinations of data—for example, the neural network might be trained with SEP data from different energy bands, SEP data in combination with solar data, and/or SEP and solar data that is temporally separated. In one embodiment, for example, the neural net is trained with x-ray data followed by SEP data. Preferably, the neural network is also trained with data that are not associated with space weather events, resulting in better predictions of quiet conditions.

In each case, the training set is derived in a manner similar to that described above in connection with the template embodiment; for each solar event or space weather event of interest, associated data are obtained from historical data stores based on the time of solar event or of the space weather event. The training input vectors are therefore the data obtained from the historical data stores and the output vectors are chosen to uniquely represent the event or quiet condition associated with the data.

After the neural network is trained, current data of the form used in training are input to the neural network, which in turn will output a vector identifying the space weather forecast.

The output vector will, in most cases, be slightly different from the idealized output vectors that were used to code the training data. For example, if the current data were from a severe west event (an event that might have been coded as <1,0,0> during training), the output vector might be <0.95, 0.002, 0.1>. Measures of prediction confidence can be obtained by looking at, for example, the Euclidian distance between the current output vector and the idealized (training-coded) output vector. Such a measure of prediction confidence could then either be output along with the prediction, or could be used to weigh this prediction in a larger (hybrid) space weather forecasting system.

In one neural network embodiment ten values of integrated proton flux greater than 1 Mev, each spaced by five hours, were used as input into the neural network. Seven hidden nodes were used and the network was trained to predict whether a geomagnetic storm would occur, generating a yes or no as its output. After training the neural networks with both events and non-events, the neural network accurately generated predictions of the training data. When new critical periods of historical data were input to the neural network it generated the historically correct prediction 94% of the time. As discussed previously, the confidence level in new forecasts can be determined by the percentage of cases in which similar observations and forecasts were made and validated.

In another neural network embodiment, separate neural networks were created for West, Central and East originating solar events. A storm is forecast if any of the neural networks predict one. When new critical periods of historical data were input to such a system of neural networks, the system generated even better predictions than the previous embodiment.

Similar results for a yes/no forecast of the occurrence of a storm can also be obtained when the West, Center and East templates are built into the neural network coefficients of a single neural network.

In other neural network embodiments for certain types of prediction (e.g., time to storm, severity of storm), it has been found that training separate neural networks on subsets of the data (for example, as described above, on West, Central and East events), as opposed to training a single neural network with all types of data, increases the accuracy of the predictions. Networks trained on other types of data (e.g., x-ray, wave) also can increase the accuracy of these types of predictions. Additionally, it has been found that forecasting accuracy can be improved by creating and using multiple neural networks each of which is trained on data derived from historical periods meeting certain criteria. For example, one neural network might be trained on data that comes from periods where solar activity was particularly high (e.g. during solar max), another might be trained on data coming from relatively calm periods. Or, one neural network might be trained on data taken from periods where Bz (the southward component of the IMF) was negative for long periods of time. Or, one neural network might be trained on data taken from periods having a high number of coronal holes, etc. Once these networks are trained, predictions will be made by inputting the real-time data to the neural network that best matches the current conditions. This customized and dynamic aspect of the space weather forecasting system increases overall accuracy and makes the system better at handling cyclical and seasonal variations in space weather.

After a prediction has been generated and some time has passed, it is possible to evaluate the accuracy of the prediction and dynamically modify the forecasting system. This can happen in several ways. In one way, as more data are obtained which fit a criteria used to generate the input-vectors, the neural network can be re-trained using this new input vector and the appropriate output vector (i.e. as, over time, "new data" become "historical data", the neural networks are re-trained using both the previously historical data as well as the "newly-historical" data).

Hybrid Space Weather Forecasting Systems

As discussed above in connection with the template embodiment, hybrid space weather forecasting systems do a better job of prediction than simple (singular) forecasting systems. One such hybrid system consists of several sets of templates (each specialized for particular space weather starting conditions, such as, but not limited to, the phase of the solar cycle) each one devoted to predicting the time-to-arrival of a space weather event. The system further consists of several neural networks and several expert systems also predicting the time-to-arrival of a space weather event. All these subsystems will operate in parallel on the incoming data. Each subsystem will generate not only a prediction (e.g. "there will be an event in the next 20 hours", etc), but also a metric indicating the confidence of the prediction (e.g. also a metric indicating the confidence of the prediction (e.g. "there is an 82% chance that there will be an event in the next 20 hours"). The overall space weather forecasting system can then yield a prediction based on, for example:

(1) an average of the subsystems predictions weighted by each systems confidence, (2) a "worst case" prediction based on taking, for example, the most severe prediction that occurs with a confidence level over some set threshold (e.g. over 80% confidence level), (3) a prediction that takes into consideration not only the current predictions and their confidence ratings, but also the predictions and confidence ratings from recent time intervals (e.g. the past 4 hours), (4) the outputs of subsystems producing different forecasts (e.g., several subsystems may forecast severity and others onset time), enabling an automatic processor and/or human operator to issue a final prediction.

As more data become available, the hybrid system updates its predictions. Notice that, as mentioned in (3), the current predictions could also be a function of previous predictions. Thus, at each moment in time, the predictions that are generated are not simply a result of a process acting on simple data, but instead the overall prediction could be a function of both new ("raw" or "processed") data as well as previously processed data. This non-linear (feedback) aspect of the space weather forecasting system in accordance with the present invention allows the current predictions to be informed by previous data and thus enables the system to more completely process the information present in the data and identify highly-complex patterns in the data.

In one preferred embodiment, when a prediction is made with a high-degree of confidence, the prediction might allow the forecasting system to extrapolate or predict future SEP or other data. In such situations, it is possible for the forecasting system to take as input (and process) either the raw data or the raw data minus the extrapolated or predicted future data. By looking at the raw data minus the predicted data, the system is better able to identify patterns indicative of a space weather event that might otherwise be hidden in the current event. For example, if a large space storm of a particular type were predicted (with a high degree of confidence), then the SEP and other data for the next several days might be contaminated by this storm. In this situation, for the next several days the predicted data could be subtracted out from the current data and, by examining the residual data, the space weather forecasting system might identify additional space weather events that might otherwise have gone unnoticed.

The hybrid systems described herein are examples of what the inventors term "multimodal intelligent systems." Multimodal intelligent systems include, but are not limited to, systems that combine two or more types of subsystems each carrying out data processing. Such processing might include neural nets, fuzzy logic, expert systems, pattern recognition systems, standard mathematical methods of digital signal processing, classical statistics, etc. For example, three neural networks that are respectively good at detecting east, center, and west events might provide a neural network discrimination or pattern recognition step before making a final prediction. The final prediction could be based on additional subsystem processing (e.g. via templates or expert systems) that occurs either in parallel (i.e. using as data the same inputs as the neural nets) or in serial (i.e. after the data have already been processed by the neural networks). A "multimodal intelligent system" is thus an artificial intelligence methodology, such as neural networks, expert systems, etc., in which there are multiple subsystems analyzing the data (either in parallel or in serial).

While the invention has been particularly shown and described with reference to particular illustrative embodiments thereof, it will be understood by those skilled in the art that various changes in form and details are within the scope of the invention, which is defined by the claims. For example, the template-based embodiment is not limited to any particular CRITERIA and the expert system embodiment is not limited to any particular set of rules. Expert system rules need not look at only mean, raw or average activity levels; they also could specify distributions, e.g., variances or standard deviations of particles or of other data (solar or geophysical). Such expert systems could also include rules based on the time between recent events or the distribution of the times between such events. Similarly neural networks systems can also include other artificial intelligence systems and intelligent hybrid systems. Additionally, the techniques described herein may be combined in various ways; for example, a hybrid system may generate predictions by applying some or all of the template-based, expert system-based and neural network-based techniques simultaneously. In one hybrid embodiment, for example, the templates may indicate fast/slow events originating from West, Central or East solar locations and peak flux and the neural network may confirm the solar origin of the events and predict whether or not a geomagnetic storm will occur. A hybrid system could generate a final prediction in many ways, such as, but not limited to, a "worst case" prediction (i.e., based on the shortest arrival time predicted by the output of the subsystems) or a weighted prediction based on some measure of confidence, certainty, or reliability (e.g., agreement over time, or number of standard deviations, or distance from ideal output, or agreement with previous prediction, etc.).

The accuracy of any of the above embodiments can be increased by using versions of the embodiments that are specialized for the particular circumstances. For example, if optical or other data sources indicate an event is in the Western longitudes of the sun, then specialized Western only templates can be used to increase accuracy. Similarly, for the neural network embodiment, if data are obtained indicating that it is currently a period of increased solar activity (e.g., solar maximum), then the neural networks specialized for these conditions can be used. Again similarly, specialized rules can be dynamically employed in an expert system. For example, in periods of low solar activity, if a peak is detected over some low threshold, a storm would be predicted, whereas in periods of high solar activity (e.g., solar maximum) a peak at a higher flux level might be required before a warning is issued.

Finally, although the algorithms and techniques described above focused primarily on SEP data, the same or similar algorithms and techniques can and have been applied by the inventors to generate space weather forecasts based on other types of solar and interplanetary and geophysical data.

What is claimed is:

1. A system for predicting space weather comprising:
   a. a source of current solar energetic particle data;
   b. a processor capable of accessing the data source, wherein the processor predicts a space weather event based on recognizing a complex pattern in the current solar energetic particle data, the pattern being derived from three or more historical solar energetic particle measurements.

2. The system of claim 1 wherein the processor predicts quiet space weather conditions based on recognizing a pattern in the current solar energetic particle data derived from historical solar energetic particle measurements associated with quiet space weather conditions.

3. The system of claim 1 further comprising
   a source of information regarding the current phase of the solar cycle;
   wherein the processor further predicts the space weather event based on the current phase of the solar cycle.

4. The system of claim 1 further comprising:
   one or more templates, each containing energetic particle data associated with a characteristic of a space weather event; and wherein the processor is capable of accessing the one or more templates and the source of current energetic particle data, and predicts the space weather event by determining which of the one or more templates is most similar to the current energetic particle data.

5. The system of claim 1 further comprising:
one or more templates, each containing energetic particle data associated with a characteristic of a space weather event; and
wherein the processor is capable of accessing the one or more templates and the source of current energetic particle data, and predicts the space weather event by selecting one or more template that are most similar to the current energetic particle data.

6. The system of claim 4 wherein the templates further contain historical space weather data and historical solar event data.

7. The system of claim 4 wherein the templates are derived from a weighted averaging of the historical data.

8. The system of claim 4 wherein the characteristic of a space weather event is one or more of geomagnetic storm onset time, geophysical location, intensity, duration, speed of arrival, and location of origin.

9. The system of claim 4 wherein the similarity between a template and the current energetic particle data is based on a Euclidean distance between the template and the current energetic particle data.

10. The system of claim 4 wherein the similarity between a template and the current energetic particle data is based on a statistical measure of similarity between the template and the current energetic particle data.

11. The system of claim 1 wherein the current energetic particle data is derived from other solar data.

12. The system of claim 1 wherein the energetic particle data is a flux of energetic particles in one or more energy ranges.

13. The system of claim 1 further comprising:
one or more sets of one or more templates, each template containing energetic particle data associated with a characteristic of a space weather event; and
wherein the processor is capable of accessing the one or more sets of one or more templates and the source of current energetic particle data, and predicts the space weather event by determining which of the one or more templates in each set is most similar to the current energetic particle data.

14. The system of claim 1 wherein the processor recognizes the pattern by applying a rule.

15. The system of claim 14 wherein the rule is detection of a peak in the energetic particle data.

16. The system of claim 15 wherein the processor averages the current energetic particle data over a predetermined time interval before applying the peak detection rule.

17. The system of claim 3 further comprising:
a source of solar data; and
wherein, the processor further predicts the space weather event based on the solar data.

18. The system of claim 17 wherein the solar data are x-ray data.

19. The system of claim 18 wherein the processor predicts the space weather event based on a determination that the x-ray data represents an increase in x-rays and the energetic particle data represents a peak in energetic particles following the increase in x-rays.

20. The system of claim 1 wherein the processor predicts the space weather event based on a neural network having an input vector comprising three or more energetic particle data values and having an output vector representing the space weather event.

21. The system of claim 20 wherein the input vector further comprises current solar cycle phase data.

22. A method for predicting space weather comprising:
a. accessing a source of current solar energetic particle data;
b. predicting a space weather event based on recognizing a complex pattern in the current solar energetic particle data, the pattern being derived from three or more historical solar energetic particle measurements.

23. The method of claim 22 wherein the predicted event is quiet conditions.

24. The method of claim 22 further comprising
accessing a source of information regarding the current phase of the solar cycle;
wherein the recognized pattern is derived from historical solar energetic particle measurements associated with a phase of the solar cycle that is the same as the current phase.

25. The method of claim 22 further comprising:
accessing one or more templates, each containing energetic particle data associated with a characteristic of a space weather event; and
wherein the step of predicting further comprises selecting one or more templates that are most similar to the current energetic particle data.

26. The method of claim 25 wherein the templates further contain historical space weather data and historical solar event data.

27. The method of claim 25 wherein the templates are derived from a weighted averaging of the historical data.

28. The method of claim 25 wherein the characteristic of a space weather event is one or more of geomagnetic storm onset time, geophysical location, intensity, duration, speed of arrival, and location of origin.

29. The method of claim 25 wherein the similarity between a template and the current energetic particle data is based on a Euclidean distance between the template and the current energetic particle data.

30. The method of claim 25 wherein the similarity between a template and the current energetic particle data is based on a statistical measure of similarity between the template and the current energetic particle data.

31. The method of claim 22 wherein the step of accessing comprises deriving current energetic particle data from other solar data.

32. The method of claim 22 wherein the energetic particle data is a flux of energetic particles in one or more energy ranges.

33. The method of claim 22 further comprising:
accessing one or more sets of one or more templates, each template containing energetic particle data associated with a characteristic of a space weather event; and
wherein the step of predicting further comprises determining which of the one or more templates in each set is most similar to the current energetic particle data.

34. The method of claim 22 wherein the pattern is recognized by applying a rule.

35. The method of claim 34 wherein the rule is detection of a peak in the energetic particle data.

36. The method of claim 35 wherein the current energetic particle data is averaged over a predetermined time interval prior to peak detection.

37. The method of claim 34 further comprising:
accessing a source of solar data; and
wherein the recognized pattern further comprises solar data.

38. The method of claim 37 wherein the solar data are x-ray data.

39. The method of claim 38 wherein the pattern is an increase in x-rays followed by a peak in energetic particles.

40. The method of claim 22 wherein the pattern is recognized by a neural network having an input vector comprising three or more energetic particle data values and having an output vector representing the space weather event.

41. The method of claim 40 wherein the input vector further comprises current solar cycle phase data.

42. The method of claim 40 further comprising the step of training the neural network with historical solar energetic particle measurements associated with quiet space weather conditions.

43. The method of claim 41 wherein the input vector further comprises x-ray data.

44. The system of claim 20 wherein the neural network is trained with historical solar energetic particle measurements associated with quiet space weather conditions.

45. The system of claim 21 wherein the input vector further comprises x-ray data.

46. The system of claim 4 wherein the characteristic of a space weather event is one or more of SEP time profiles, peak flux, energy, or fluence at one or more specific locations.

47. The system of claim 1 wherein the prediction is of one or more of geomagnetic storm onset time, geophysical location, intensity, duration, speed of arrival, and location of origin.

48. The system of claim 1 wherein the prediction is of one or more of SEP time profiles, peak flux, energy, or fluence at one or more specific locations.

49. The system of claim 48 wherein the specific locations are one or more of a space station, a geostationary orbit, high latitudes and high altitudes.

50. Computer code for predicting space weather embedded in a storage medium performing the steps of:
   a. accessing a source of current solar energetic particle data;
   b. predicting a space weather event based on recognizing a complex pattern in the current solar energetic particle data, the pattern being derived from three or more historical solar energetic particle measurements.

51. The system of claim 18 wherein the processor predicts the space weather event based on a determination that the x-ray data represents an increase in x-rays and the energetic particle data represents a rise in energetic particles following the increase in x-rays.

52. The system of claim 1 wherein the source of current energetic particle data is a source of proxy data from which energetic particle data can be derived and the processor derives energetic particle data from the proxy data.

53. The system of claim 52 wherein the proxy data are data relating to one or more of changes in intensity, frequency, polarity, location, and direction of solar-surface magnetic field structures, coronal hole structures, x-rays, radio waves, microwaves, helioseismology parameters, filament and arcade structures.

54. The system of claim 1 wherein the energetic particle data comprises at least two different types of energetic particle data.

55. The system of claim 1 wherein the complex pattern comprises a pattern in a first type of energetic particle data followed at a later time by a pattern in a second type of energetic particle data.

56. The system of claim 1 further comprising:
a source of one or more of solar, interplanetary, and geophysical data; and
wherein, the processor further predicts the space weather event based on the one or more of solar, interplanetary, and geophysical data.

57. The system of claim 1 wherein the processor further predicts the space weather event based on data derived from previous predictions.

58. The system of claim 1 wherein the processor further predicts the space weather event while another space weather event is in progress.

59. The system of claim 1 wherein the processor continuously accesses current solar energetic particle data and continuously predicts space weather events.

60. The system of claim 1 wherein the prediction comprises a severity of the space weather event.

61. The system of claim 1 wherein the prediction comprises a duration of the space weather event.

62. The system of claim 1 wherein the prediction comprises a speed of arrival of the space weather event.

63. The system of claim 1 wherein the prediction comprises the onset time of the space weather event.

64. The system of claim 1 wherein the prediction comprises a location at which the space weather event will occur.

65. The system of claim 1 wherein the prediction comprises a location from which the space weather event will originate.

66. The method of claim 22 wherein the step of accessing comprises accessing a source of proxy data and deriving current energetic particle data from the proxy data.

67. The system of claim 1 wherein the processor further generates a confidence value indicating a level of confidence that the predicted space weather event will actually occur.

68. The system of claim 2 wherein the processor further generates a confidence value indicating a level of confidence that the prediction will actually occur.

69. The method of claim 22 further comprising the step of generating a confidence value indicating a level of confidence that the predicted space weather event will actually occur.

70. The system of claim 67 wherein the confidence value is determined based on a percentage of instances in which the recognized pattern previously preceded the predicted space weather event.

71. The system of claim 4 wherein the templates further contain one or more of historical solar, interplanetary, and geophysical data.

72. The system of claim 4 wherein the templates are time-locked to a solar event.

73. The system of claim 4 wherein the templates are time-locked to a space weather event.

74. The system of claim 4 wherein at least one of the one or more templates is comprised of sub-templates, each sub-template containing different types of data associated with the characteristic of the space weather event.

75. The system of claim 4 wherein at least one of the one or more templates is comprised of sub-templates, each sub-template containing data associated with the characteristic of the space weather event, and wherein the sub-templates have a temporal relationship to one another.

76. The system of claim 4 wherein at least one of the one or more templates is comprised of sub-templates, each sub-template containing different types of data associated with the characteristic of the space weather event, wherein a first sub-template contains energetic particle data and a second sub-template contains x-ray data.

77. The system of claim 4 wherein the processor is capable of modifying the selected most similar template based on whether the predicted space weather event actually occurs.

78. The system of claim 4 wherein the processor determines which of the one or more templates is most similar by comparing current energetic particle data to portions of the templates.

79. The system of claim 4 wherein the templates also contain variance data.

80. The method of claim 25 wherein the templates further contain one or more of historical solar, interplanetary, and geophysical data.

81. The system of claim 4 wherein each template has an associated confidence value indicating a degree to which the template is an accurate predictor of its associated space weather event characteristic.

82. The system of claim 81 wherein the templates are derived from a weighted averaging of historical data and the confidence value is derived from the variance-covariance of the historical data.

83. The system of claim 81 wherein the confidence value is determined based on a percentage of instances of similar historical data that preceded the associated space weather event characteristic.

84. The system of claim 13 wherein each template has an associated confidence value indicating a degree to which the template is an accurate predictor of its associated space weather event characteristic and wherein the processor further predicts the space weather event based on the confidence values of the most similar templates in the sets of templates.

85. The system of claim 14 further comprising a source of one or more of solar, interplanetary, and geophysical data; and the rule further comprises a pattern in solar, interplanetary, and geophysical data.

86. The system of claim 85 wherein the source of one or more of solar, interplanetary, and geophysical data is a source of x-ray data and the pattern is a change in x-rays followed by a change in energetic particles.

87. The system of claim 14 wherein the rule is based on one or more parameters derived from variations in energetic particle counts over a recent time interval, a number of hours since a last space weather event, and a number of hours since a space weather event preceding the last space weather event.

88. The method of claim 34 further comprising:
accessing a source of one or more of solar, interplanetary, and geophysical data; and
wherein the recognized pattern further comprises one or more of solar, interplanetary, and geophysical data.

89. The method of claim 38 wherein the pattern is an increase in x-rays followed by a change in energetic particles.

90. The system of claim 14 wherein the processor further generates a confidence value indicating a level of confidence that the predicted space weather event will actually occur, wherein the confidence value is based on a comparison between the energetic particle data and recent solar activity.

91. The system of claim 14 wherein the processor further generates a confidence value indicating a level of confidence that the predicted space weather event will actually occur, and wherein the confidence value is based on the Fourier characteristics of the energetic particle data.

92. The system of claim 15 wherein the processor further generates a confidence value indicating a level of confidence that the predicted space weather event will actually occur, wherein the confidence value is based on a comparison of the detected peak's size and other peaks in the recent past.

93. The system of claim 20 wherein the neural network also outputs a confidence value indicating a level of confidence that the predicted space weather event will actually occur, and wherein the confidence value is based on a comparison between the current output vector and an idealized output vector.

94. The system of claim 1 wherein the processor recognizes the complex pattern based on a hybrid system comprising two or more template, expert and neural network subsystems, wherein each template subsystem comprises
one or more templates, each containing at least one of three or more energetic particle data values, solar data, interplanetary data, and geophysical data associated with a characteristic of a space weather event, wherein the processor is capable of accessing the one or more templates and the source of current data, and determines which of the one or more templates is most similar to the current data; and wherein each expert subsystem comprises one or more rules applied by the processor to recognize a complex pattern in at least one of energetic particle, solar, interplanetary, and geophysical data; and wherein each neural network subsystem comprises a neural network having an input vector comprising at least one of three or more energetic particle data values, solar data, interplanetary data, and geophysical data; and wherein at least one of the subsystems operates on energetic particle data.

95. The system of claim 94 wherein at least two subsystems operate on different types of data.

96. The system of claim 94 wherein at least two subsystems operate on data from different time periods.

97. The system of claim 94 wherein at least two subsystems predict different characteristics of the space weather event.

98. The system of claim 94 wherein the prediction generated by at least one of the subsystems is used as an input to at least one of the subsystems.

99. The system of claim 94 wherein one or more subsystems generate predictions for a specific phase of the solar cycle.

100. The system of claim 94 wherein at least one of the energetic particle, solar, interplanetary and geophysical data are derived from proxy data.

101. The system of claim 1 wherein the processor recognizes the complex pattern in the current energetic particle data based on a multimodal intelligent system.

102. The system of claim 94 wherein at least two subsystems predict the same characteristic of the space weather event, each subsystem generating a confidence value indicating a level of confidence that the predicted space weather event characteristic will actually occur, and wherein the hybrid system generates a prediction based on the average of the subsystems' predictions, each weighted by its respective confidence value.

103. The system of claim 94 wherein at least two subsystems predict the same characteristic of the space weather event, each subsystem generating a confidence value indicating a level of confidence that the predicted space weather characteristic will actually occur, and wherein the hybrid system generates a prediction based on the most severe prediction generated by one of the subsystems in which the confidence value for that prediction is above a predetermined threshold.

104. The system of claim 94 wherein each subsystem generates a confidence value indicating a level of confidence that the predicted space weather characteristic will actually occur, and wherein the hybrid system generates a prediction based on the subsystems' predictions and confidence values.

105. The system of claim 94 wherein the hybrid system generates a prediction that is further based on past predictions and confidence values generated by the subsystems.

* * * * *